US011653399B2

(12) United States Patent
Ryoo et al.

(10) Patent No.: US 11,653,399 B2
(45) Date of Patent: May 16, 2023

(54) METHOD AND APPARATUS FOR TRANSMITTING AND RECEIVING SIGNALS IN WIRELESS COMMUNICATION SYSTEM

(71) Applicant: Samsung Electronics Co., Ltd., Suwon-si (KR)

(72) Inventors: Sunheui Ryoo, Suwon-si (KR); Daekyu Shin, Suwon-si (KR); Dongwoo Lee, Suwon-si (KR); Hyungtaig Lim, Suwon-si (KR); Janghwan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 630 days.

(21) Appl. No.: 16/688,295

(22) Filed: Nov. 19, 2019

(65) Prior Publication Data

US 2020/0163142 A1 May 21, 2020

(30) Foreign Application Priority Data

Nov. 21, 2018 (KR) ........................ 10-2018-0144378

(51) Int. Cl.
*H04W 76/15* (2018.01)
*H04W 24/10* (2009.01)

(52) U.S. Cl.
CPC ........... *H04W 76/15* (2018.02); *H04W 24/10* (2013.01)

(58) Field of Classification Search
CPC ... H04W 76/15; H04W 24/10; H04W 72/042; H04W 72/0453; H04W 76/27; H04W 72/045

See application file for complete search history.

(56) References Cited

U.S. PATENT DOCUMENTS 9,775,188 B2 9/2017 Kim
10,050,761 B2 8/2018 Khay-Ibbat et al.
(Continued)

FOREIGN PATENT DOCUMENTS

| CN | 104868974 B | * | 7/2018 | ........... H04L 45/245 |
| EP | 2 502 456 A2 | | 9/2012 | |
| EP | 3 101 942 A1 | | 12/2016 | |

OTHER PUBLICATIONS

'3GPP; TSG RAN; E-UTRA and E-UTRAN; Overall description; Stage 2 (Release 15)', 3GPP TS 36.300 V15.3.0, Oct. 2, 2018, sections 5.1.8, 5.5.
(Continued)

*Primary Examiner* — Jamal Javaid
*Assistant Examiner* — Ryan C Kavleski
(74) *Attorney, Agent, or Firm* — Jefferson IP Law, LLP

(57) ABSTRACT

The present disclosure relates to a communication scheme and system for converging a $5^{th}$ generation (5G) communication system for supporting a data rate higher than that of a $4^{th}$ generation (4G) system with an internet of things (IoT) technology. The present disclosure is applicable to intelligent services (e.g., smart home, smart building, smart city, smart car or connected car, health care, digital education, retail, and security and safety-related services) based on the 5G communication technology and the IoT-related technology. A proposed method for a base station to transmit information controlling configuration of an uplink (UL) secondary component carrier (SCC) corresponding to a secondary cell in a wireless communication system supporting carrier aggregation (CA) includes identifying first information associated with an uplink electric field of a primary cell, transmitting measurement configuration information associated with the secondary cell to a terminal, receiving a measurement report message associated with the secondary cell from the terminal, identifying second information asso-
(Continued)

ciated with a downlink electric field of the secondary cell based on the measurement report message, and transmitting the information controlling configuration of the UL SCC of the secondary cell to the terminal based on at least one of the first information or the second information.

20 Claims, 23 Drawing Sheets

(56) References Cited

U.S. PATENT DOCUMENTS

| 10,212,629 | B2 | 2/2019 | Kishiyama et al. |
| 2013/0121297 | A1* | 5/2013 | Kim ........................ H04L 5/001 370/329 |
| 2013/0155983 | A1 | 6/2013 | Choi et al. |
| 2013/0230010 | A1 | 9/2013 | Kim et al. |
| 2015/0195796 | A1* | 7/2015 | Sivanesan ........... H04W 52/247 370/329 |
| 2015/0230206 | A1 | 8/2015 | Tabet et al. |
| 2016/0183151 | A1* | 6/2016 | Wu ....................... H04W 24/10 370/332 |
| 2016/0242091 | A1 | 8/2016 | Krishnamoorthy et al. |
| 2016/0360462 | A1* | 12/2016 | Chockalingam .. H04W 36/0058 |
| 2017/0208582 | A1* | 7/2017 | Liang ........................ H04L 5/14 |
| 2018/0035432 | A1 | 2/2018 | Jeon et al. |
| 2018/0249459 | A1 | 8/2018 | Bala et al. |
| 2018/0262998 | A1* | 9/2018 | Park .................... H04W 52/146 |
| 2018/0376491 | A1* | 12/2018 | Ferdowsi .......... H04W 72/1268 |
| 2019/0261444 | A1* | 8/2019 | Axmon ................ H04B 7/0626 |
| 2020/0059395 | A1* | 2/2020 | Chen .................... H04W 24/10 |
| 2021/0168673 | A1* | 6/2021 | Fan ........................ H04W 76/15 |

OTHER PUBLICATIONS

International Search Report and Written Opinion dated Feb. 24, 2020, issued in International Patent Application No. PCT/KR2019/015880.
Interdigital Communications, "Activation/Deactivation MAC Control Element for LTE CA", 3GPP Draft, R2-104817, Aug. 17, 2010.
Extended European Search Report dated Nov. 19, 2021, issued in European Patent Application No. 19887728.4.
Korean Office Action dated Oct. 17, 2022, issued in a counterpart Korean Application No. 10-2018-0144378.

* cited by examiner

METHOD AND APPARATUS FOR TRANSMITTING AND RECEIVING SIGNALS IN WIRELESS COMMUNICATION SYSTEM

CROSS-REFERENCE TO RELATED APPLICATION(S)

This application is based on and claims priority under 35 U.S.C. § 119(a) of a Korean patent application number 10-2018-0144378 filed on Nov. 21, 2018, in the Korean Intellectual Property Office, the disclosures of which is incorporated by reference herein in entirety.

BACKGROUND

1. Field

The disclosure relates to a method and apparatus for transmitting and receiving signals including information in a wireless communication system.

The disclosure relates to a method and apparatus for transmitting and receiving information controlling configuration of an uplink (UL) secondary component carrier (SCC) corresponding to a secondary cell in a wireless communication system supporting carrier aggregation (CA). More particularly, the disclosure relates to a method and apparatus for transmitting and receiving information controlling configuration, deconfiguration, or maintenance of a UL SCC corresponding to a secondary cell to improve UL CA throughput in a CA mode.

2. Description of Related Art

To meet the increased demand for wireless data traffic since the deployment of $4^{th}$ generation (4G) communication systems, efforts have been made to develop an improved $5^{th}$ generation (5G) or pre-5G communication system. Therefore, the 5G or pre-5G communication system is also called a "Beyond 4G Network" or a "Post LTE System". Implementation of the 5G communication system in higher frequency (mmWave) bands, e.g., 60 GHz bands, is being considered in order to accomplish higher data rates. To decrease propagation loss of radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system. In addition, in the 5G communication system, there are developments under way for system network improvement based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like. In the 5G system, Hybrid FSK and QAM Modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

The Internet, which is a human centered connectivity network where humans generate and consume information, is now evolving into the Internet of Things (IoT) where distributed entities, such as things, exchange and process information without human intervention. The Internet of Everything (IoE), which is a combination of IoT technology and Big Data processing technology through connection with a cloud server, has emerged. As technology elements, such as "sensing technology", "wired/wireless communication and network infrastructure", "service interface technology", and "security technology" have been demanded for IoT implementation, recently there has been research into a sensor network, Machine-to-Machine (M2M) communication, Machine Type Communication (MTC), and so forth. Such an IoT environment may provide intelligent Internet technology services that create new values for human life by collecting and analyzing data generated among connected things. The IoT may be applied to a variety of fields including smart home, smart building, smart city, smart car or connected car, smart grid, health care, smart appliances, and advanced medical services through convergence and combination between existing Information Technology (IT) and various industrial applications.

In line with these developments, various attempts have been made to apply the 5G communication system to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be an example of convergence between the 5G technology and the IoT technology.

In the legacy mobile communication system, a telephone service was provided through a public switched telephone network. Meanwhile, the recent advance in communication technologies has established a broadband mobile data communication infrastructure, which make it possible to provide data communication-based Internet telephony, i.e., voice over Internet protocol (VoIP) service. A user may use the VoIP service over an access network that provides Internet protocol (IP) connectivity.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for transmitting and receiving information controlling configuration of a uplink (UL) secondary component carrier (SCC) corresponding to a secondary cell in a carrier aggregation (CA)-based wireless communication system that is capable of selecting a best UL SCC to maximize a user equipment (UE)-perceived throughput in performing a UL SCC configuration, deconfiguration, or maintenance control.

Another aspect of the disclosure is provide a method for transmitting and receiving information controlling configuration of a UL SCC corresponding to a secondary cell in a CA-based wireless communication system that is capable of maximizing a UL terminal-perceived throughput (UE-perceived throughput) and satisfying a user QoS (Meet the criteria of latency) by reducing configuration latency.

Various disclosed embodiments aim to provide a method for transmitting and receiving information controlling configuration of a UL SCC corresponding to a secondary cell in a CA-based wireless communication system that is capable of minimizing network (N/W) signaling overhead caused by frequent state transitions occurring along with the ping-pong effect in performing a UL SCC configuration, deconfiguration, or maintenance control.

Another aspect of the disclosure is to provide a method for a base station to transmit information controlling configuration of a UL SCC corresponding to a secondary cell in consideration of an uplink electric field environment of a primary cell in a CA-based wireless communication system.

Additional aspects will be set forth in part in the description which follows and, in part, will be apparent from the description, or may be learned by practice of the presented embodiments.

In accordance with an aspect of the disclosure, a method for a base station to transmit information controlling configuration of an uplink (UL) secondary component carrier (SCC) corresponding to a secondary cell in a wireless communication system supporting carrier aggregation (CA) is provided. The method includes identifying first information associated with an uplink electric field of a primary cell, transmitting measurement configuration information associated with the secondary cell to a terminal, receiving a measurement report message associated with the secondary cell from the terminal, identifying second information associated with a downlink electric field of the secondary cell based on the measurement report message, and transmitting the information controlling configuration of the UL SCC of the secondary cell to the terminal based on at least one of the first information or the second information.

In accordance with another aspect of the disclosure, a method for a terminal to receive information controlling configuration of an uplink (UL) secondary component carrier (SCC) corresponding to a secondary cell in a wireless communication system supporting carrier aggregation (CA) is provided. The method includes receiving measurement configuration information associated with the secondary cell from a base station, transmitting a measurement report message associated with the second cell to the base station based on the measurement configuration information, and receiving the information controlling configuration of the UL SCC of the secondary cell from the base station, wherein the information controlling configuration of the UL SCC is generated based on first information associated with an uplink electric field of a primary cell or second information associated with a downlink electric field of the secondary cell, the second information being identified based on the measurement report message.

In accordance with another aspect of the disclosure, a base station for transmitting information controlling configuration of an uplink (UL) secondary component carrier (SCC) corresponding to a secondary cell in a wireless communication system supporting carrier aggregation (CA) is provided. The base station includes a transceiver and at least one processor configured to control to identify first information associated with an uplink electric field of a primary cell, control the transceiver to transmit measurement configuration information associated with the secondary cell to a terminal and receive a measurement report message associated with the secondary cell from the terminal, control to identify second information associated with a downlink electric field of the secondary cell based on the measurement report message, and control the transceiver to transmit the information controlling configuration of the UL SCC of the secondary cell to the terminal based on at least one of the first information or the second information.

In accordance with another aspect of the disclosure, a terminal for receiving information controlling configuration of an uplink (UL) secondary component carrier (SCC) corresponding to a secondary cell in a wireless communication system supporting carrier aggregation (CA) is provided. The terminal includes a transceiver and at least one processor configured to control the transceiver to receive measurement configuration information associated with the secondary cell from a base station, transmit a measurement report message associated with the second cell to the base station based on the measurement configuration information, and receive the information controlling configuration of the UL SCC of the secondary cell from the base station, wherein the information controlling configuration of the UL SCC is generated based on first information associated with an uplink electric field of a primary cell or second information associated with a downlink electric field of the secondary cell, the second information being identified based on the measurement report message.

In a CA-based wireless communication system according to various disclosed embodiments, a downlink electric field may be determined based on a measurement report received from a terminal, and an uplink electric field may be determined based on at least one of signal to interference and noise ratio (SINR) information, power headroom report (PHR) information, or transport block size (TBS) information.

In a CA-based wireless communication system according to various disclosed embodiments, a base station may transmit information configuring a UL SCC of a secondary cell based on neither an uplink electric field of a primary cell nor a downlink electric field of the secondary cell being weak.

In a CA-based wireless communication system according to various disclosed embodiments, a base station may transmit information that prevents configuring of a UL SCC of an SCell based on at least one of an uplink electric field of a primary cell or a downlink electric field of the secondary cell being weak.

In a CA-based wireless communication system according to various disclosed embodiments, a base station may transmit information deconfiguring a UL SCC configured to a secondary cell based on at least one of an uplink electric field of a primary cell, a downlink electric field of the secondary cell, or an uplink electric field of the secondary cell being weak.

In a CA-based wireless communication system according to various disclosed embodiments, a base station may transmit information configuring a UL SCC corresponding to a secondary cell selected among at least one secondary cell based on receipt of, while a timer is running, at least one measurement report message associated with the at least one secondary cell.

In a CA-based wireless communication system according to various disclosed embodiments, a method may be provided for controlling configuration, deconfiguration, and/or maintenance of a UL SCC based on an uplink electric field environment of a primary cell in addition to a measurement report (MR) performed based on a cell-specific signal (CRS) as a downlink reference signal (RS).

In a CA-based wireless communication system according to various disclosed embodiments, a method may be provided for a base station to configure a timer for receiving a measurement report (MR) being transmitted by a terminal in order to select a UL SCC based thereon in a UL CA SCC change operation.

In a CA-based wireless communication system according to various disclosed embodiments, a method may be provided for a base station to make a final selection of a UL SCC by reflecting a weight factor in a situation where multiple measurement reports (MRs) are received while a timer for receiving the MRs is running.

In a CA-based wireless communication system according to various disclosed embodiments, a method for transmitting/receiving information controlling configuration of a UL SCC corresponding to a secondary cell is provided for maximizing an uplink peak throughput or average throughput of a terminal by selecting a best UL SCC while minimizing a UL SCC configuration and change delay in consideration of both uplink and downlink electric field environments.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
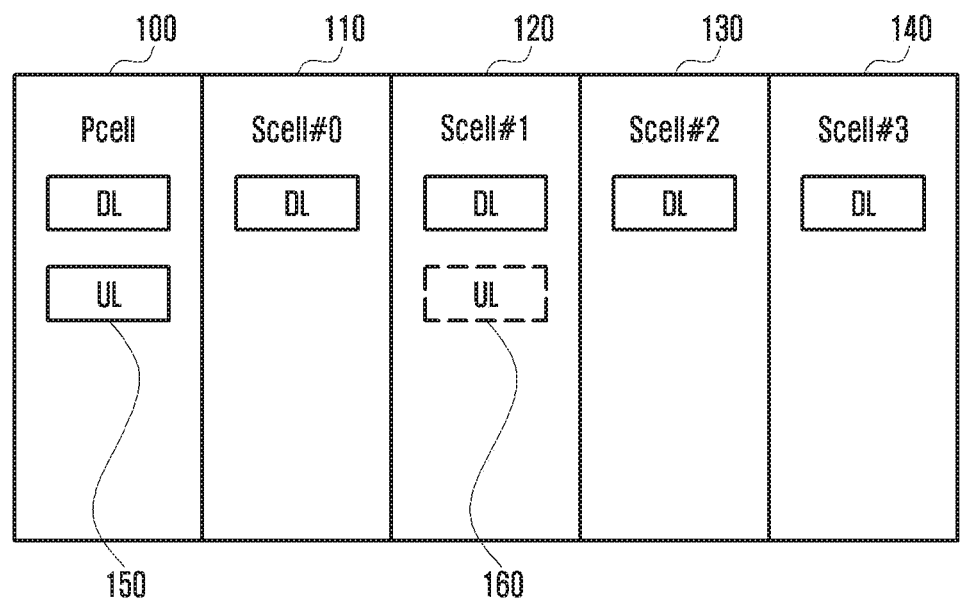
FIG. 1 is a conceptual diagram illustrating a carrier aggregation (CA) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, the term "base station (BS)" denotes an entity for allocating resources to terminals and is intended to include at least one of a Node B, an evolved Node B (eNB), a radio access unit, a base station controller, and a network node. The term "terminal" is intended to include a user equipment (UE), a mobile station (MS), a cellular phone, a smartphone, a computer, and a multimedia system with a communication function. The term "downlink (DL)" denotes a radio transmission path from a base station to a UE, and the term "uplink (UL)" denotes a radio transmission path from the UE to the base station. Although the description is directed to an LTE or LTE-A system by way of example, the disclosure is applicable to other communication systems having a similar technical background and channel format. For example, the disclosure is applicable to the 5th generation (5G) mobile communication technology (5G new radio (NR)) under development after LTE-A. It will be understood by those skilled in the art that the disclosure can be applied even to other communication systems with a slight modification without departing from the spirit and scope of the disclosure.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or they may be performed in reverse order according to their functions. According to various embodiments of the disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more CPUs in a device or a secure multimedia card. In an embodiment, a module may include one or more processors.

FIG. 1 is a conceptual diagram illustrating a carrier aggregation (CA) system according to an embodiment of the disclosure.

In a single carrier system, a UE is assigned one carrier in UL and DL. Although different in bandwidth, one carrier is assigned to the UE.

Referring to FIG. 1, n a CA system, however, the UE may be assigned multiple component carriers. A component carrier (CC) is a term in use in the CA system and may be referred to simply as carrier.

A CA system may be categorized into one of a contiguous CA system in which contiguous carriers are aggregated and a non-contiguous CA system in which separated carriers are aggregated. In the following description, it should be understood the term CA system is intended to include both the contiguous and non-contiguous CA systems unless otherwise specified.

A system frequency band of a wireless communication system is divided into multiple carrier frequencies. Here, the term "carrier frequency" may mean a center frequency of a cell. In the following description, the term "cell" may mean DL and UL frequency resources. A cell may also mean a combination of DL frequency resources and optional UL frequency resources. If CA is left out of consideration, a cell may exist as UL and DL frequency resources that are always paired.

For packet data communication through a certain cell, the UE has to complete configuration of the cell. Here, the term "configuration" means a state in which system information necessary for data communication through the corresponding cell has been completely received. For example, a configuration procedure may include receiving common physical layer parameters or media access control (MAC) layer parameters necessary for data communication or parameters necessary for certain operations in a radio resource control (RRC) layer. The configured cell may enter a state capable of transmitting/receiving a packet upon receipt of information indicating that packet data transmission is possible.

The configured cell may stay in an activated or deactivated state. Here, if a cell is activated, this means that data transmission or reception is performed or is ready. The UE may monitor or receive a physical downlink control channel (PDCCH) and a physical downlink shared channel (PDSCH) of the activated cell to identify for the resources (frequency, time, etc.) allocated to itself.

If a cell is deactivated, this means that data transmission or reception is not allowed and only measurement and minimum information can be transmitted/received. The UE may receive system information (SI) necessary for receiving packets from the deactivated cell. However, the UE does not monitor the PDCCH and PDSCH of the deactivated cell to identify for the resources (frequency, time, etc.) allocated to itself.

As described above, CA may be applied. CA is a technique for securing a broad band by aggregating multiple narrow band CCs. A CC may be categorized into one of a DL CC (100, 110, 120, 130, 140) and a UL CC (150, 160). A cell may be defined as a pair of a DL CC (100, 120) and a UL CC (150, 160) or a DL CC (110, 130, 140) and, in this case, CA may be understood as aggregation of multiple cells.

In CA, there may be a primary cell (PCell) for performing an initial connection/reconnection procedure between a UE and a base station and secondary cells (Scells) that are added in addition to the PCell.

A cell may be categorized into one of PCell, SCell, and serving cell.

The PCell is a cell operating on a primary frequency for use in performing an initial connection establishment or procedure or connection reestablishment procedure between a UE and a base station or is designated as the primary cell during a handover procedure.

The SCell is a cell operating on a secondary frequency and is configured to provide additional radio resources once an RRC connection is established.

The serving cell is configured as a PCell of a UE that is not configured with CA or does not support CA. In the case where CA is configured, a UE may be configured with multiple serving cells. One serving cell may be configured with a DL CC or a pair of a DL CC and a UL CC. The multiple serving cells may be grouped into a set of one PCell and one or more SCells.

A primary CC (PCC) means a CC corresponding to the PCell. The PCC is a CC for use in performing initial connection or RRC connection between a UE and a base station among multiple CCs. The PCC is a special CC responsible for connection or RRC connection for signaling about multiple CCs and managing UE context as UE-specific connection information. The PCC is always in an activated state while the UE is connected so as to be in an RRC connected mode. A DL CC corresponding to the PCell is referred to as a DL PCC (100), and a UL CC (150) corresponding to the PCell is referred to as a UL PCC.

A secondary CC (SCC) means a CC corresponding to an SCell. That is, the SCC is a CC assigned to a UE in addition to the PCC, as an extended carrier to allocate additional resources to the UE, and it may be in an activated or deactivated state. A DL CC corresponding to an SCell is referred to as DL SCC (110, 120, 130, 140), and a UL CC (160) corresponding to an SCell is referred to as UL SCC.

The PCell and SCell have different characteristics as follows.

First, the PCell is used for transmitting a physical uplink control channel (PUCCH). Second, the PCell is always activated, while the SCell is activated/deactivated according to a predetermined condition. Third, the PCell is characterized in that RLF triggers RRC connection reestablishment. Fourth, the PCell may be changed by a security key change or a handover procedure involving a random access channel (RACH) procedure. Fifth, non-access stratum (NAS) information is received through the PCell. Sixth, the PCell is always configured with a pair of a DL PCC and a UL PCC in an FDD system. Seventh, the PCell can be configured with a different CC per UE. Eighth, The PCell can be changed only through a handover or cell (re)selection procedure. In order to add a new SCell, RRC signaling may be used for transmitting system information of a dedicated SCell.

A serving cell may be configured only with a DL CC or a DL CC and a UL CC associated with the DL CC. A serving cell cannot be configured only with a UL CC.

Activating/deactivating a CC is identical in meaning with activating/deactivating a serving cell. For example, assuming a serving cell 1 configured with DL CC1, activating serving cell 1 denotes activating DL CC1. Assuming a serving cell 2 configured with DL CC2 and UL CC2, activating serving cell 2 denotes activating DL CC2 and UL CC2. In this regard, each CC may correspond to a serving cell.

A number of CCs being aggregated may differ between DL and UL. The number of DL CCs being aggregated and the number of UL CCs being aggregated may be equal to each other so as to be referred to as symmetric aggregation or different from each other so as to be referred to as asymmetric aggregation. The CCs may differ in size (i.e., bandwidth). For example, a band of 70 MHz may be achieved by aggregating 5 CCs that differ in size, i.e., carrier #0 (5 MHZ CC), carrier #1 (20 MHz CC), carrier #2 (20 MHz CC), carrier #3 (20 MHz CC), and carrier #4 (5 MHz CC).

As described above, a CA system may support multiple CCs, i.e., multiple serving cells as opposed to a single carrier system.

As shown in FIG. 1, a PCC (or PCell) or an anchor CC (or anchor cell) may be designated among DL and UL CCs configured to a UE for specific purposes. For example, it may be possible to always configure a DL PCC (or DL PCell) for transmitting RRC connection configuration or reconfiguration information as an example or a UL PCC (or UL PCell) as a UL CC for use by a UE in transmitting a PUCCH carrying UL control information (UCI) as another example.

The DL PCC (or PCell) and UL PCC (PCell) are basically configured per UE. In the case where a very large number of CCs are configured to a UE or multiple base stations configure CCs to a UE, the UE may have one or more DL PCCs (PCells) and/or UL PCCs (PCells) configured by one or more base stations. A DL PCC (PCell) and a UL PCC (PCell) may be linked by a base station in a UE-specific manner.

The methods for transmitting and receiving information controlling configuration of a UL SCC corresponding to a secondary cell in wireless communication system supporting a CA according to various disclosed embodiments are capable of protecting against uplink throughput degradation (e.g., increase of RRC Connection Reestablishment, increase of outage, and frequent occurrence of radio link failure (RLF)) caused by dividing UL power of a UE for a PCell and an SCell in such a way of preventing configuration of a UL SCC in a weak UL electric field environment, thereby improving functionality of a UL CA-based wireless communication system.

Various disclosed embodiments provide methods for a base station to control a UL CA-based UE to refrain from adding a UL SCell and release UL SCells below a predetermined electric field strength.

The proposed method makes it possible to protect against an attach failure (e.g., attach complete failure) even in a UL coverage shrinkage situation caused by PCell UL transmit power reduction because of a weak UL electric field strength in a UL CA-based system.

Typically in a CA-based wireless communication system, a base station may perform uplink power control based on a P_max value for a UE to which the UL CA is not configured.

In the CA-based wireless communication system, the base station may set P_max to Pc_max (Pc_max<P_max) via an RRC reconfiguration procedure to change the maximum reference value of per-SCC UL power based thereon in configuring the UL CA to the UE.

However, a method and a timing for applying the maximum UL power control value may vary depending on UE implementation.

For example, given that P_max is limited to Pc_max for a certain UE group even in the situation where a configured UL SCC is deactivated, the PCell UL transmit power decreases from 23 dBm to 21 dBm, resulting in aggravating UL CA performance degradation in a weak electric field area.

Such a UL CA performance degradation may decrease the UL peak throughput or average throughput of the UE.

An acknowledgement/negative-acknowledgement (ACK/NACK) transmission error occurring in a hybrid automatic repeat request (HARQ) process may also cause the DL CA performance degradation that results in reduction of the DL peak throughput or average throughput of the UE.

Furthermore, a PCell UL performance degradation causes UL control signal (UCI) and UL RRC control signal transmission failure, which is likely to increase an RLF occurrence probability and raise a call disconnection problem.

In order to solve the above problems, the methods disclosed in various embodiments enable a base station to select a best UL SCC in controlling configuration, deconfiguration, and maintenance of a UL CA SCC, thereby maximizing the UE-perceived throughput.

The methods for controlling configuration of a UL SCC in a CA-based wireless communication system according to various disclosed embodiments are capable of maximizing the UE-perceived throughput, satisfying a user QoS by reducing configuration latency, and meeting a latency standard.

The methods for controlling configuration of a UL SCC in a CA-based wireless communication system according to various disclosed embodiments are also capable of allowing the RRC layer of a base station to refrain from configuring a UL SCC in a situation where a DL reception quality measured by a UL CA UE is equal to or worse than that corresponding to a predetermined electric field strength, thereby mitigating UL CA performance degradation in a weak electric field environment.

The RRC layer of the base station may also de-configure a UL SCC in the aforementioned weak electric field environment.

The MAC layer of the base station may perform an operation for protecting against configuring a UL SCC based on a power headroom report (PHR) for the PCell. The MAC layer of the base station may also control deconfiguration of a UL SCC in the aforementioned weak electric field environment. According to various disclosed embodiments, UEs may be classified based on whether a UL CA is applied in a CA-based wireless communication system.

Although the UL CA performance degradation in a weak electric field environment gives a very bad impact to the system throughput as described above, not all UEs experience such UL CA performance degradation.

That is, a UE may or may not experience a UL CA performance degradation in a weak electric field environment depending on UE implementation, i.e., UE power class.

Refraining from configuration of a UL SCC in a weak electric field environment may reduce the chances of applying UL CA, leading to a decrease in cell UL capacity.

According to various disclosed embodiments, a base station may apply the operation of refraining from configuring a UL CA in a weak electric field environment only to a predetermined UE group that needs the operation to be applied.

According to various disclosed embodiments, UEs may be classified according to their implementations.

For example, UEs may be sorted into groups according to a method and a timing of the maximum UL power control value as follows.

1) A group of high power UEs with UE power class 1 that are free from a weak electric field environment 2) A group of UEs to which Pc_max is applied at startup of UL CA configuration 3) A group of UEs to which the maximum power control value is applied at the activation of corresponding UL SCCs after UL CA configuration 4) A group of UEs to which the maximum power control value is applied for UL traffic transmission according to the UL scheduling that resulted from a real UL grant transmission after corresponding UL SCC activation following UL CA configuration According to various disclosed embodiments, a base station may sort the UEs that need UL CA to be applied in the weak electric field environment based on at least one of UE power class information, service profile identifier (SPID) information, or International Mobile Equipment Identity (IMEI) information, per aforementioned UE group.

According to various disclosed embodiments, the base station may sort the UEs that need UL CA to be applied in the weak electric field environment into a high power UE (HPUE) group of UEs with UE power class 1, which are free from a weak electric field environment, and a non-HPUE group based on UE power class information.

Examples of a HPUE may include a special class UE introduced for LTE.

In LTE standard Release 11, the 3GPP introduced HPUE in band 14 (700 MHz). As opposed to legacy UEs that are allowed to transmit at a maximum output power of 23 dBm, the HPUEs are allowed to transmit with an output power of up to 31 dBm.

Given that the transmit power of the higher power UE determines the transmission range, the cell coverage is increased from 4 Km to 8 Km, leading to a broader coverage with the same number of eNBs, which provides a basis of the assumption that no weak electric field situation occurs for the high power UE in the disclosed embodiments.

According to various disclosed embodiments, the base station may sort the UEs that need UL CA to be applied in the weak electric field environment based on the SPID information. For example, the corresponding operation may be performed in such a way that a home subscriber server (HSS) of an operator's core network may configure RAT/Frequency Selection Priority (RFSP) information (e.g., RFSP index) of the UE to which Evolved-Universal Terrestrial Radio Access-New Radio (EN-DC) is configured for dual connectivity of LTE and NR in a UE-specific manner (e.g., prioritize a second carrier frequency band over a first carrier frequency band) and transmit the configured RFSP information to a mobility management entity (MME).

The base station may include the SPID per target frequency band in the system information based on the corresponding RFSP information.

The base station may prioritize frequencies when releasing the RRC of the UE.

The UE may perform cell reselection based on the SPID information of prioritized frequencies.

Assuming that the second carrier frequency band is prioritized over the first carrier frequency band for the UE configured with the dual connectivity, the cell reselection may be performed for the second carrier frequency band.

According to various disclosed embodiments, the base station may sort the UEs that need UL CA to be applied in the weak electric field environment based on international mobile equipment identity software version (IMEISV) information.

According to various disclosed embodiments, the base station may control to enable or disable UL monitoring according to a band combination (BC) as a combination of carriers available for UL CA, i.e., per UE UL CA BC.

In the disclosure, a valid UL BC may denote a UL band combination available for UL CA.

A UE does not support all band combinations (BCs) for UL CA. This is because of the economic feasibilities of devices such as a radio frequency (RF) circuit and low noise amplifier (LNA), i.e., because it is preferable to support BC with devices as small in number as possible, considering that installing individual RF modules equal in number to the bands is likely to decrease marketability in view of product price and size.

The BCs for UL CA or DL CA are specified in the standard specification of 3GPP TS38.307.

For example, the UE may transmit to the base station a UE capability report indicating CA BCs (DL CA BC or UL CA BC) supported by the UE among the BCs.

The base station may control configuration of a UL SCC based on the corresponding UL CA BCs.

In the disclosure, enabling or disabling UL monitoring means, but is not limited to, turning on or off a function for the base station to monitor MAC for UL PHR to judge a DL or UL weak electric field and trigger electric field situation change via an RRC layer.

As described above, although the UL CA performance degradation in a weak electric field environment has a very bad impact on the system throughput, not all UEs experience such UL CA performance degradation.

For example, a UE may or may not experience a significant UL CA performance degradation in a weak electric field environment depending on UE implementation, i.e., UE power class.

The operation of refraining from configuring a UL CA in the weak electric field environment may also reduce the chances of applying UL CA, leading to decreasing cell UL capacity.

According to various disclosed embodiments, the base station may apply the operation of refraining from configuring a UL CA in a weak electric field environment only to a predetermined UE group that needs the operation to be applied.

Table 1 summarizes UL SCC configuration modes and per-mode advantages and disadvantages.

In the disclosure, a blind mode may mean a mode in which a base station can configure a UL SCC without configuring a UE measurement report as opposed to a measurement report (MR) mode.

TABLE 1

|  | Advantages | Disadvantages |
| --- | --- | --- |
| Mode0: Blind UL CA configuration | Short configuration time | Frequent occurrences of RLF and RRC Connection Reestablishment (RRE) in weak electric field environment |
| Mode1: DL electric field-based UL CA configuration | Long configuration time | Possible to avoid RLF and RRE in weak electric field environment (when DL/UL electric field reciprocity is achieved) |
| Mode2: UL + DL electric field-based UL CA configuration | Long configuration time | Possible to avoid RLF and RRE in weak electric field environment |

According to various disclosed embodiments, the base station may support a PCell UL electric field-based UL CA SCC configuration (config) and deconfiguration (deconfig) function and an activation/deactivation configuration mode.

According to various disclosed embodiments, the base station may turn on or off the aforementioned function in an operation configuration mode.

For example, the above function may be turned off to allow CA addition for DL and UL in the blind mode and turned on to allow CA addition for DL in the blind mode but UL only in the PCell in the blind mode.

Figure 2:
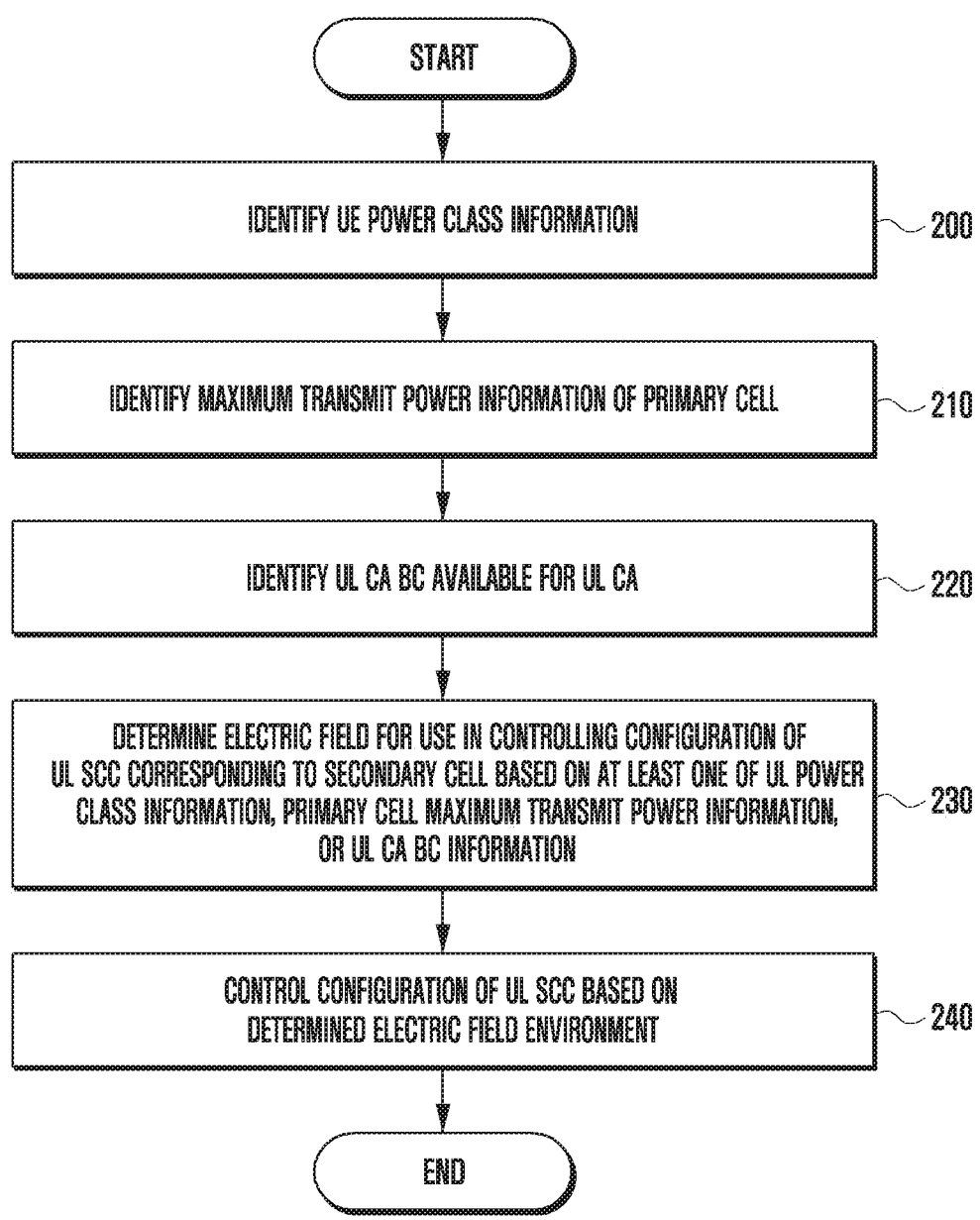
FIG. 2 is a flowchart illustrating a procedure for controlling configuration of an uplink (UL) secondary component carrier (SCC) corresponding to an SCell in a CA system according to an embodiment of the disclosure.

FIG. 2 is a flowchart illustrating a procedure for controlling configuration of a UL SCC corresponding to an SCell in a CA system according to an embodiment of the disclosure.

Referring to FIG. 2, a base station may identify UE power class information at operation 200, PCell maximum transmit power information at operation 210, and UE UL CA BC information at operation 220.

In the disclosure, a combination of carriers that can be aggregated in uplink may be referred to as UL CA BC.

Operations 200 to 220 are not limited to the order in which they are enumerated and may be performed in order or in parallel.

At operation 230, the base station may determine whether to take either the SCell DL electric field environment or the SCell DL electric field environment and PCell UL electric field environment into consideration for UL SCC configuration based on at least one of the UE power class information, PCell maximum transmit power information, or UE UL CA BC information.

At operation 240, the base station may control configuration of a UL SCC based on the electric field environment determined at operation 230. A detailed description thereof is made hereinafter with reference to FIG. 3.

Figure 3:
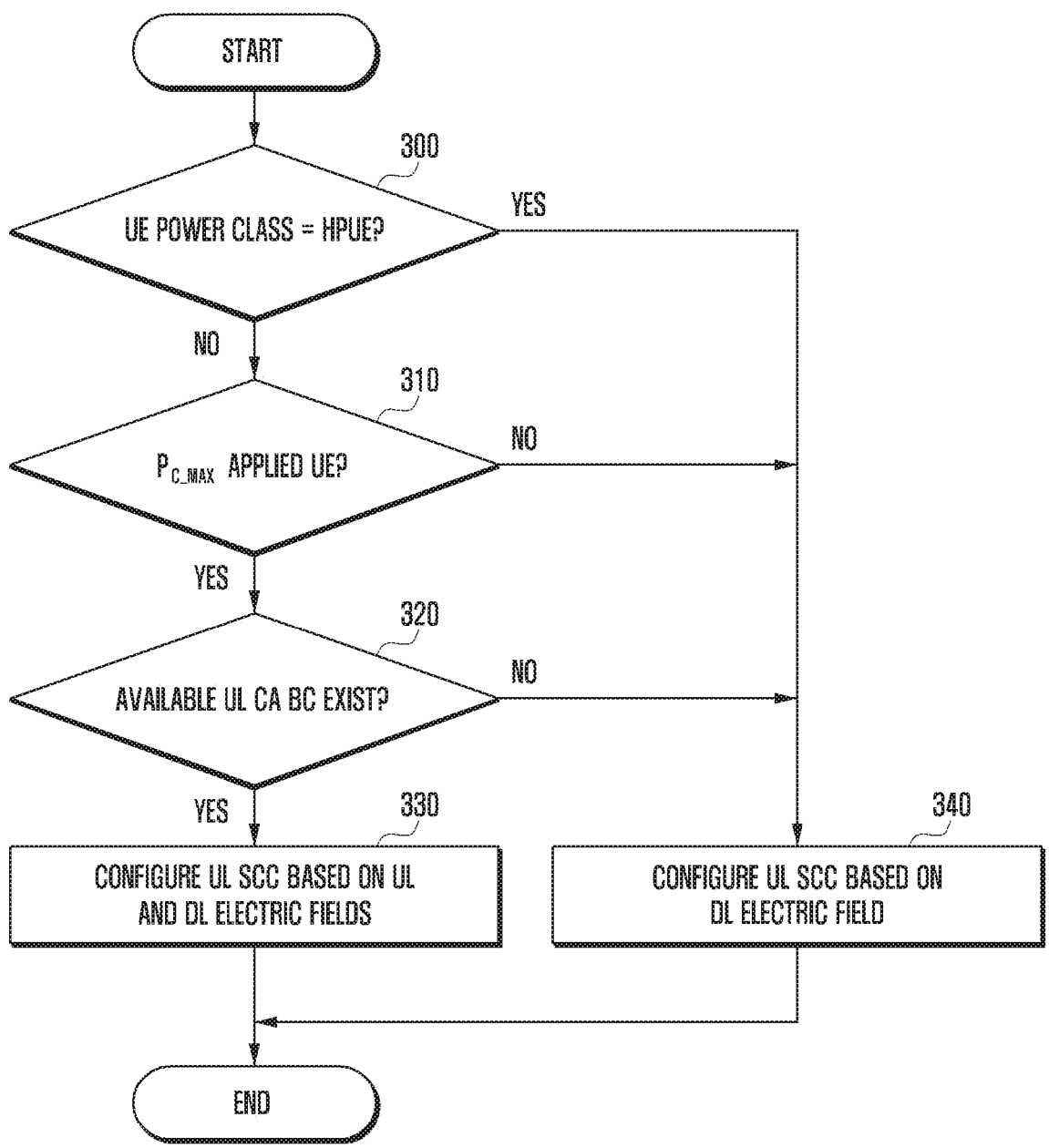
FIG. 3 is a flowchart illustrating a procedure for a base station to determine whether to apply a PCell UL-based UL SCC configuration function according to an embodiment of the disclosure.

FIG. 3 is a flowchart illustrating a procedure for a base station to determine whether to apply a PCell UL-based UL SCC configuration function according to an embodiment of the disclosure.

Referring to FIG. 3, according to various disclosed embodiments, the base station may sort UEs into groups based on UE power class at operation 300.

For example, the base station may sort UEs into a HPUE group of the UEs with UE power class 1, which are free from a weak electric field environment, and a non-HPUE group.

The base station determines at operation 300 whether a UE is a HPUE; if so, this means that the UE is free from the weak electric field environment, and the base station may apply, at operation 340, an SCell DL electric field environment-only based UL SCC configuration.

If it is determined at operation 300 that the UE is a non-HPUE, the base station may determine at operation 310 whether the UE is a UE to which Pc_max is applied based on the PCell maximum transmit power information.

For example, if it is determined that the non-HPUE is a UE to which Pc_max is not applied at operation 310, the base station may apply, at operation 340, the SCell DL electric field environment-only based UL SCC configuration.

If it is determined that the non-HPUE is a UE to which Pc_max is applied at operation 310, the base station may determine at operation 320 whether the UE has a valid UL CA BC.

For example, if the non-HPUE is a UE to which Pc_max is applied and has no valid UL CA BC at operation 320, the base station may apply the SCell DL electric field environment-only based UL SCC configuration at operation 340.

If it is determined that the non-HPUE is a UE to which Pc_max is applied, and has a valid UL CA BC at operation 320, the base station may apply a SCell DL and PCell UL electric field environments-based UL SCC configuration at operation 330.

Figure 4:
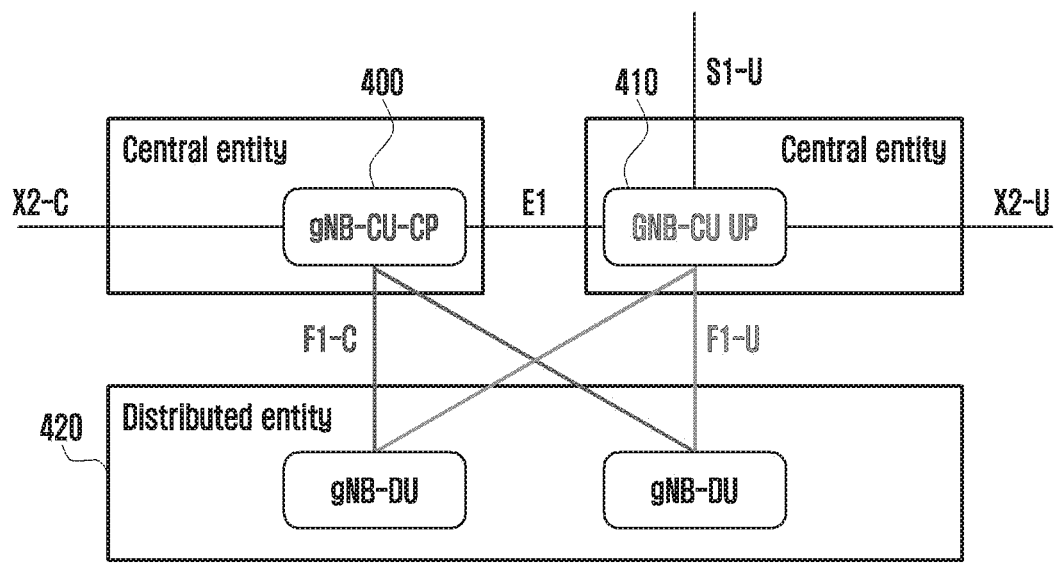
FIG. 4 is a diagram illustrating base station virtualization architecture with interfaces between network entities in a 5G communication system according to an embodiment of the disclosure.

FIG. 4 is a diagram illustrating base station virtualization architecture with interfaces between network entities in a 5G communication system according to an embodiment of the disclosure.

The terms "gNB Central Unit (gNB-CU)", "gNB-Cu-Control Plane (gNB-CU-CP)", "gNB-CU-User Plane (gNB-CU-UP)", and "gNB Distributed Unit (gNB-DU)" defined in TS 38.401 may be substituted respectively for "central unit included in a secondary node (SN, secondary gNB, SgNB)", "central unit-control plane (CU-CP) included in secondary node (SN, secondary gNB, SgNB)," "central unit-user plane (CU-UP) included in secondary node (SN, secondary gNB, SgNB)", and "distributed unit (DU) included in secondary node (SN, secondary gNB, SgNB)" in the disclosed EN-DC system.

That is, gNB-CU-Control Plane (gNB-CU-CP), gNB-CU-User Plane (gNB-CU-UP), and gNB Distributed Unit (gNB-DU) may be respectively referred to as CU-CP, CU-UP, and DU in the disclosure.

Referring to FIG. 4, a 5G gNB may include three network entities, i.e., CU-CP, CU-UP, and DU.

As shown in FIG. 4, the control plane CU-CP 400, the user plane CU-UP 410, and the DU 420 including MAC, RLC, and PHY layers may be connected via external interfaces of E1, F1 Control plane interface (F1-C)/F1 User plane interface (F1-U).

In the wireless communication system according to various disclosed embodiments, information from the MAC layer to the RRC layer may be delivered via intra-control signaling of the base station in the non-virtualization architecture as shown in FIG. 4.

In the virtualization architecture in which the CU and the DU are separated as shown in FIG. 4, it is necessary to define F1-C interface operations and messages for exchanging control information between the MAC layer (DU) and the RRC layer (CU-CP).

According to various disclosed embodiments, the CU-CP (RRC) may configure a parameter for use by the DU in monitoring an electric field environmental metric via the F1-C interface.

According to various disclosed embodiments, the DU may send information indicating an electric field environment determined based on the environmental metric-monitoring result to the CU-CP (RRC) via the F1-C interface.

For example, the MAC layer (DU) may indicate the electric field environment monitoring result as an index to the RRC layer (CU-CP) using an F1 application protocol (F1AP) message defined in 3GPP standard TS 38.473.

As described in the disclosed embodiments, a base station may determine the UL electronic field environment based on at least one of Signal to Interference and Noise Ratio (SINR) information, a DMRS- and SRS-based received signal level, power headroom report (PHR) information, or transport block size (TBS) information that is received from a UE. For example, the MAC layer may transmit information including each of UL information, PHR-based TRS, and UL SINR, or a combination thereof to the CU (RRC layer) via the F1-C interface.

For example, the corresponding information may trigger a field including information indicating change of DU information based on a threshold value via the F1-C interface. For example, if an event in which the corresponding information changes to become equal to or greater or less than a threshold value occurs over a predetermined number of time corresponding to a counter value, the field including the information indicating change of the DU information may be transmitted via the F1-C interface.

The CU-CP (RRC) may control and configure the DU based on a configuration value for the above operation.

Examples of the configuration may include a UL or DL SINR threshold value and a PHR-based TBS threshold value for triggering a flag related to the UL electric field (UL_strength_Flag triggering).

According to various disclosed embodiments, the wireless communication system may count a number of times when an event in which the corresponding information becomes equal to or greater than or less than the threshold value, i.e., crossing the threshold, to configure a number of times for changing the UL electric field-related flag value (UL_strength_Flag value).

Figure 5:
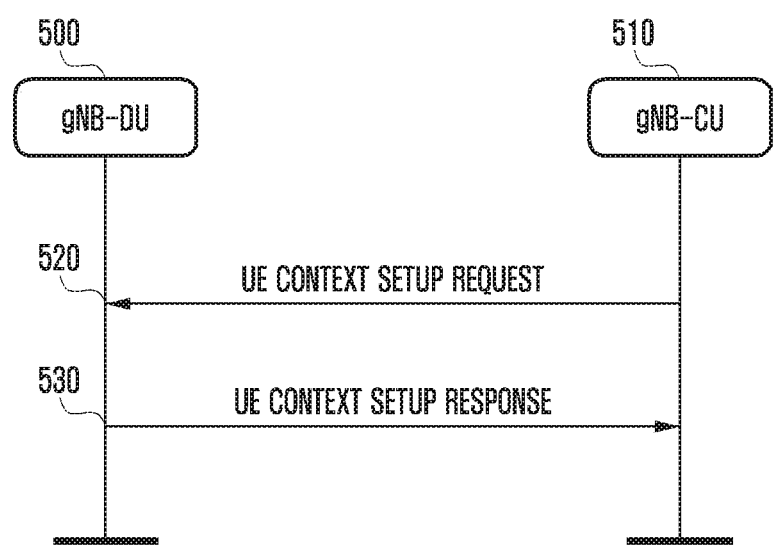
FIGS. 5 to 7 are signal flow diagrams illustrating information exchange between a CU and a DU in a 5G communication system according to various embodiments of the disclosure.
Figure 6:
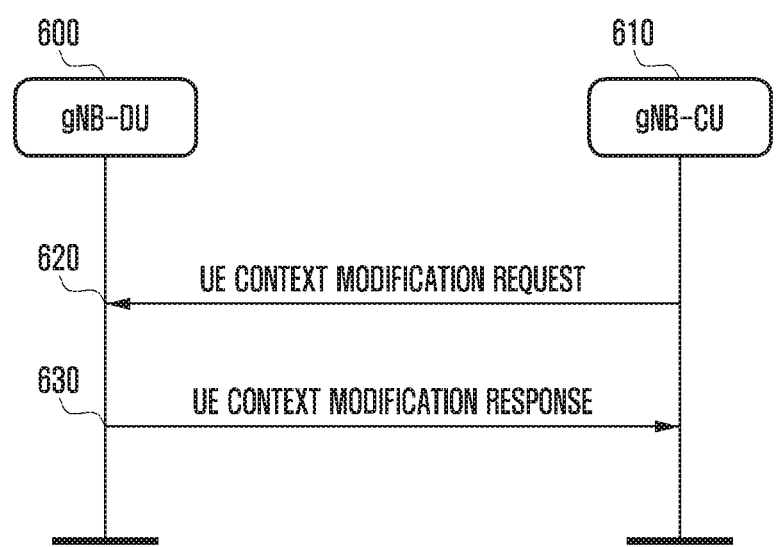
Figure 7:
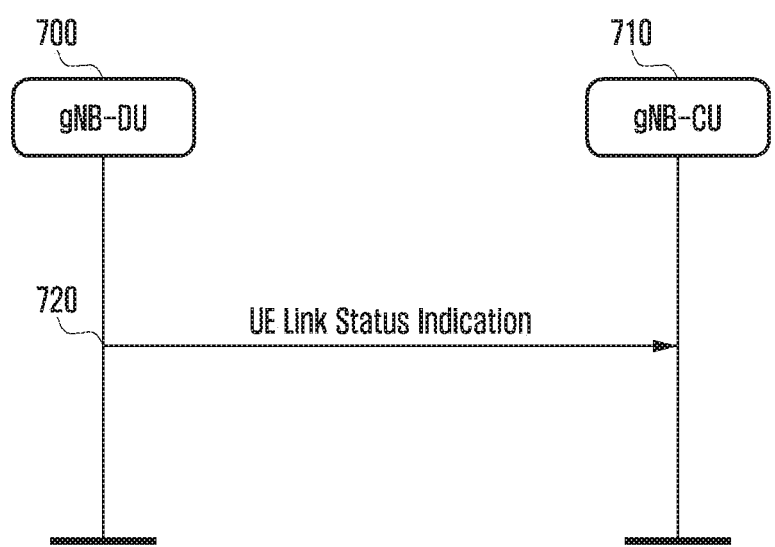

FIGS. 5 to 7 are signal flow diagrams illustrating information exchange between a CU and a DU in a 5G communication system according to various embodiments of the disclosure.

Referring to FIG. 5, the configuration operation may be performed through a UE Context Setup Request procedure in which the CU 510 and DU 500 exchange UE CONTEXT SETUP REQUEST 520 and RESPONSE 530 messages or a UE Context Modification procedure in which the CU and DU exchange UE CONTEXT MODIFICATION REQUEST and RESPONSE messages.

According to various disclosed embodiments, the DU may perform MAC/RLC monitoring with a parameter configured by the CU-CP and send information indicating a flag value representing the electric field environment as a monitored metric-based determination result to the CU-CP (RRC) via the F1-C interface.

The above operation may be applied to a UE Link Status Notification procedure in such a way of transmitting the information in an information field of a new or legacy F1-C message.

The above operation is not limited to a UL_strength_Flag-related operation and may be extended to an operation of sending information indicating a flag value as a result of monitoring MAC/RLC metrics including a UL electric field environment to the CU-CP (RRC) via the F1-C interface according to an embodiment.

Referring to FIG. 6, the configuration operation may be performed through a UE Context Modification procedure in which the CU 610 and DU 600 exchange UE CONTEXT MODIFICATION REQUEST 620 and RESPONSE 630 messages.

Referring to FIG. 7, the DU 700 may send the CU 710 a UE Link Status indication message 720 according to various embodiments of the disclosure.

Figure 8:
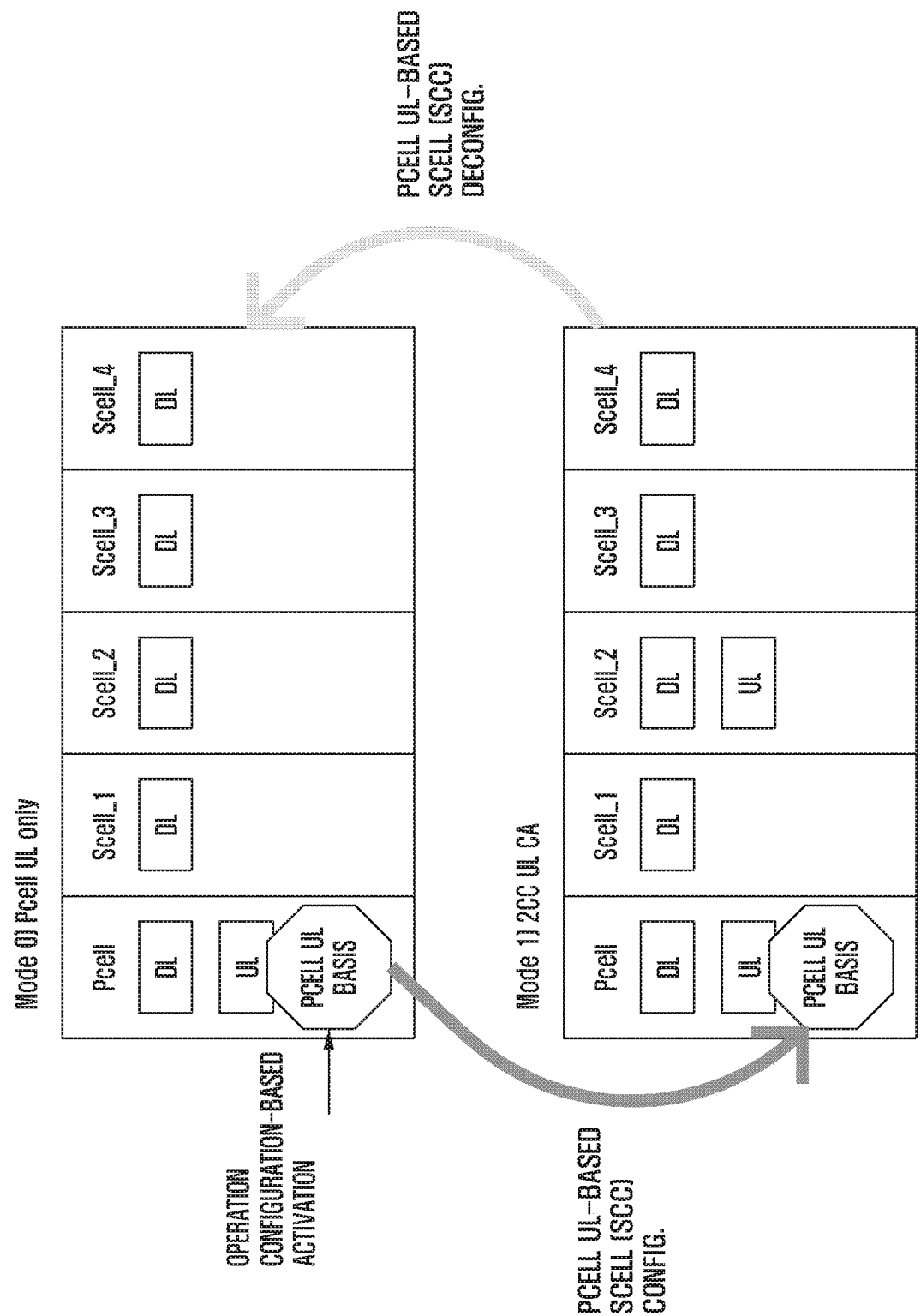
FIGS. 8 and 9 are conceptual diagrams illustrating procedures for a base station to configure and deconfigure a UL SSC in consideration of at least one of UL and DL electric field environments according to various embodiments of the disclosure.
Figure 9:
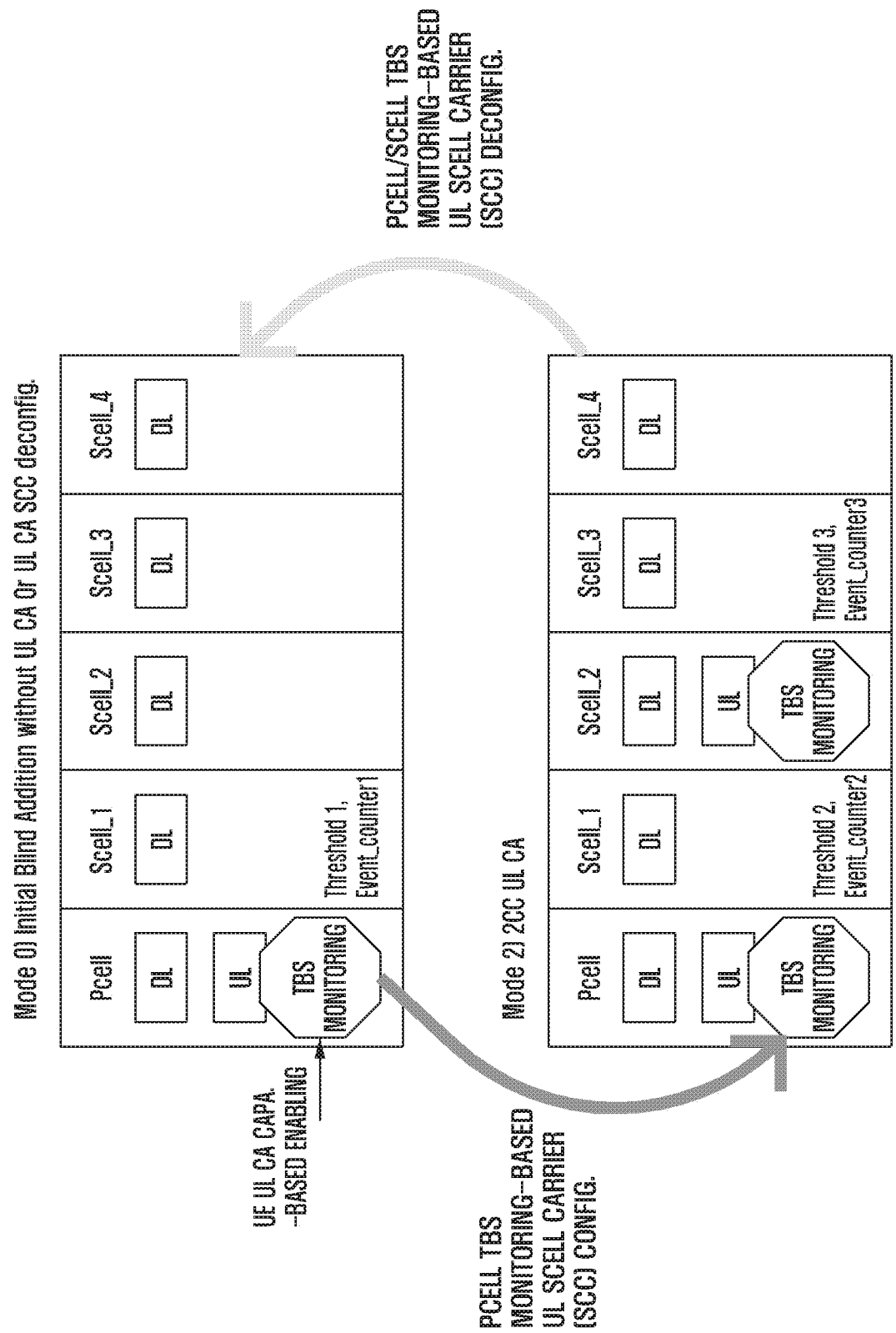

FIGS. 8 and 9 are conceptual diagrams illustrating procedures for a base station to configure and deconfigure a UL SSC in consideration of at least one of UL and DL electric field environments according to various embodiments of the disclosure.

According to various disclosed embodiments, the base station may determine a UL electric field environment.

According to various disclosed embodiments, the base station may determine a UL electric field environment of at least one of a PCell or SCells based on at least one of information on SINR, information on PHR, or information on TBS.

According to various disclosed embodiments, a base station may receive first information on a PCell UL electric field from the UE.

For example, the first information may indicate a PCell UL electric field strength that is strong, moderate, or weak.

According to various disclosed embodiments, the first information on the PCell UL electric field is obtained based on at least one of SINR information, PHR information, or TBS information.

According to various disclosed embodiments, the base station may identify the PHR received from the UE for a number of allocable resource blocks (RBs) and a modulation and coding scheme (MCS) and calculate a maximum supportable TBS of the PCell (=PcellMaxTbs) based on the number of RBs and the MCS.

According to various disclosed embodiments, the base station may identify third information on the SCell UL electric field from the UE.

For example, the third information on the SCell UL electric field may be obtained based on at least one of SINR information, PHR information, or TBS information.

For example, the third information may indicate an SCell UL electric field strength that is strong, moderate, or weak.

For example, the base station may calculate the maximum supportable TBS (=ScellMaxTbs) for the SCell using the number of allocable RBs and the MCS identified based on the PHR.

According to various disclosed embodiments, the base station may perform calculation of the maximum supportable TBS for a PCell or SCell based on whether a PHR is received from the UE or the MCS is changed.

According to various disclosed embodiments, if an event occurs in which a corresponding TBS calculation value changes to become equal to or greater or less than a predetermined threshold value, control information toggling the flag value is sent from the MAC layer to the RRC layer in the base station. According to various disclosed embodiments, the flag value corresponding to the TBS calculation value may be sent from the MAC layer to the RRC layer periodically at a predetermined interval.

According to various disclosed embodiments, the base station may determine a DL electric field environment.

According to various disclosed embodiments, the base station may determine the DL electric field environment based on a measurement report message received from the UE.

According to various disclosed embodiments, the base station may transmit cell-specific measurement configuration information to the UE. In the following description, a message including the measurement configuration information is referred to as a measurement configuration message. The UE may perform measurement based on the measurement configuration information. If a measurement result fulfills a reporting condition in the measurement configuration information, the UE may report the measurement result to the base station. In the following description, a message including the measurement result is referred to as a measurement report message.

For example, the reporting condition may include an event that triggers reporting the measurement result and periodicity information.

As described above, the UE may report the measurement result in an event-triggered manner That is, the measurement result is reported upon occurrence of a predetermined event. The event is predetermined per cell. For example, an event may be designated for a serving cell, a neighboring cell, a PCell, an SCell, or a combination of thereof. An SCell is basically treated as a serving cell and, in association with a specific event, as a neighboring cell.

In 3GPP LTE and NR, a base station may configure only one measurement target to a UE in a frequency band.

TABLE 2

| Event | Description | Example |
|---|---|---|
| A1 | Serving becomes better than threshold | |
| A2 | Serving becomes worse than threshold | Cell Release |
| A3 | Neighbour becomes offset better than serving | Handover |
| A4 | Neighbour becomes better than threshold | Cell Add |
| A5 | PCell becomes worse than threshold 1 and neighbour becomes better than threshold 2 | |
| A6 | Neighbour becomes offset better than SCell | |
| B1 | Inter RAT neighbour becomes better than threshold | |
| B2 | PCell becomes worse than threshold 1 and inter RAT neighbour becomes better than threshold 2 | |

According to various embodiments, measurement events may be summarized as shown in Table 2 in which event A1 is that the serving cell has a channel condition batter than a threshold, event A2 is that the serving cell has a channel condition worse than the threshold, and event A3 is that a neighboring cell has a channel condition equal to or better than an offset plus the channel condition of the serving cell. Event A4 is that the neighboring cell has a channel condition better than the threshold. Event A5 is that the PCell has a channel condition worse than a first threshold while a neighboring cell has a channel condition better than a second threshold, and event A6 is that the neighboring cell has a channel condition equal to or better than the offset plus the channel condition of the SCell.

If the measurement result satisfies the above events (quality measurement report condition) configured as above, the UE may transmit a measurement report (MR) message to the base station, and the base station may determine the DL electric field environment based on the MR message received from the UE.

According to various disclosed embodiments, if the UE transmits to the base station an A1 MR based on the event in which the channel condition of the serving cell is better than the threshold, the base station may determine that the DL electric field strength is strong based on the A1 MR.

According to various disclosed embodiments, if the UE transmits to the base station an A2 MR based on the event in which the channel condition of the serving cell is worse than the threshold, the base station may determine that the DL electric field strength is weak based on the A2 MR.

In a CA-based wireless communication system according to various disclosed embodiments, the base station may transmit SCell measurement configuration information to the UE, receive an SCell MR message from the UE, and identify the MR message for second information on the SCell DL electric field. For example, the second information indicates an SCell DL electric field strength that is strong, moderate, or weak.

In a CA-based wireless communication system according to various disclosed embodiments, the base station may transmit PCell measurement configuration information to the UE, receive a PCell MR message from the UE, and identify the MR message for fourth information on the PCell DL electric field. For example, the fourth information indicates the strength of the PCell DL electric field, which falls in one of strong, moderate, and weak electric field strengths.

In a CA-based wireless communication system according to various disclosed embodiments, the base station may configure a UL CA SCC configuration mode in separation from a DL CA mode.

According to various disclosed embodiments, a base station may support a UL SCC configuration operation based on whether the electric field strength is strong in the PCell of the LTE system or the NR SA system or in each of the PCells and the Spcells corresponding to the respective PCells in the EN-DC system even in the CA blind addition mode for UL CA.

Referring to FIG. 8, the base station may configure or deconfigure a UL SCC corresponding to a SCell in consideration of the PCell UL electric field environment.

According to various disclosed embodiments, the MAC layer of the base station may control the operation for refraining from configuring a UL SCC and deconfiguring the UL SCC based on the PHR for the PCell.

According to various disclosed embodiments, the RRC layer of the base station may perform an operation for refraining from configuring a UL SCC in a situation where at least one of the PCell UL electric field strength or the SCell DL electric field strength at a UL CA UE is weaker than a predetermined electric field strength.

The RRC layer of the base station may deconfigure the UL SCC in an environment in which at least one of the PCell UL electric field strength, SCell DL electric field strength, or SCell UL electric field strength is weak.

FIG. 9 is a conceptual diagram illustrating a PCell TBS monitoring-based UL SCC configuration and deconfiguration operation of a base station according to various disclosed embodiments.

Referring to FIG. 9, according to various disclosed embodiments, the base station configures a UL SCC as follows.

For example, the MAC layer of the base station may set a flag to 1 (flag=1), for the case where the PCell UL electric field strength is equal to or greater than a first threshold (Threshold1) or Event_count1 indicating that the number of times that an event occurs in which the PCell UL electric field strength becomes greater than the first threshold is equal to or greater than a predetermined value, and send the flag set to 1 (flag=1) to the RRC layer of the base station.

As described above, the MAC layer of the base station may send a flag set to 1 (flag=1) to the RRC layer of the base station based on at least one of the PCell DL electric field environment or Event_count1.

Upon receipt of the flag (flag=1) from the MAC layer, the RRC layer of the base station may trigger UL SCC configuration based on the value of the received flag.

For example, the RRC layer of the base station may configure (config.) a UL SSC for the corresponding cell based on the value of the flag received from the MAC layer.

The RRC layer of the base station may also configure a UL SSC based on the value of the flag (flag=1) received from the MAC layer and an A1 MR including a result of measurement performed, after the receipt of the flag, on a DL reference signal (e.g., CRS) of the corresponding SSC.

That is, according to various disclosed embodiments, the RRC layer of the base station may identify the flag received from the MAC layer for the PCell UL electric field information and the MR message received from the UE for the SCell DL electric field information. In this case, the base station may transmit information controlling configuration of a UL SCC corresponding to the SCell to the UE based on at least one of the PCell UL electric field information or the SCell DL electric field information.

For example, the base station may transmit information indicative of refraining from configuring a UL SSC in the case where at least one of the PCell UL electric field or SCell DL electric field is weak.

According to various disclosed embodiments, the base station de-configures a UL SCC as follows.

For example, the MAC layer of the base station may set a flag to 0 (flag=0), for the case where at least one of the PCell or SCell UL electric field strengths is equal to or greater than a second threshold (Threshold2) or Event_count2 indicating that the number of times that an event occurs in which the SCell UL electric field strength becomes greater than the second threshold is equal to or less than a predetermined value, and send the flag set to 0 (flag=0) to the RRC layer of the base station.

As described above, the MAC layer of the base station may send a flag set to 0 (flag=0) to the RRC layer of the base station based on at least one of PCell and SCell UL electric field environments or Event_count2.

According to various disclosed embodiments, the RRC layer of the base station may trigger UL RRC deconfiguration based on the value of the flag received from the MAC layer. In the disclosure, the MAC layer of the base station may set the flag in consideration of at least one of PCell and SCell UL electric field environments.

According to various disclosed embodiments, the MAC layer of the base station may determine a UL electric field monitoring target as follows.

1) The flag is set and sent in consideration of only the PCell UL electric field.
2) The flag is set and sent in consideration of only the SCell UL electric field.
3) The flag is set and sent in consideration of both the PCell and SCell UL electric fields.

In the embodiment of 3), if at least one of the PCell and SCell UL electric fields is weak, the MAC layer of the base station may set the flag to 0 (flag=0) and send the flag (flag=0) to the RRC layer of the base station.

For example, in the case where a predetermined UE group needs the corresponding optional configuration, if the SCell UL electric field is weak, Pc_max of the PCell may decrease (e.g., from 23 dB to 21 dB) because the SCell is added, even though the UL of the SCell is not scheduled.

Accordingly, in the above embodiment, if at least one of the PCell and SCell UL electric fields is weak, the MAC layer of the base station may set the flag to 0 (flag=0) and send the flag (flag=0) to the RRC layer of the base station in order to protect against the lowering of Pc_max of the PCell.

In the embodiment of 3), if at least one of the PCell and SCell electric fields is weak, the MAC layer of the base station may send a flag set to 0 (flag=0) to the RRC layer of the base station. The embodiment of 3) may include a combination of the above described embodiments.

According to various disclosed embodiments, the RRC layer of the base station may trigger UL SCC deconfiguration based on an DL MR received from a UE as a result of measurement performed by the UE on a DL reference signal of at least one of the PCell or the SCell and a value of the flag received from the MAC layer.

Upon receipt of the flag set to 0 (flag=0) from the MAC layer, the RRC layer of the base station may trigger UL SCC deconfiguration in consideration of at least one of the PCell and SCell DL electric field environments as follows.

1) UL SCC deconfiguration is performed in consideration of only the PCell DL electric field (PCell A2 MR).
2) UL SCC deconfiguration is performed in consideration of only the SCell DL electric field (SCell A2 MR).
3) UL SCC deconfiguration is performed in consideration of both the PCell and SCell DL electric fields (PCell/SCell A2 MR).

In the embodiment of 3), if at least one of the PCell and SCell DL electric fields is weak, this triggers UL SCC deconfiguration.

For example, in the case where a predetermined UE group needs the corresponding optional configuration, if the SCell UL electric field is weak, Pc_max of the PCell may decrease (e.g., from 23 dB to 21 dB) because the SCell is added, even though the UL of the SCell is not scheduled.

In the embodiment of 3), UL SCC deconfiguration is performed, for the case where at least one of the PCell and SCell DL electric fields is weak, to protect against the lowering of the Pc_max of the PCell. The embodiment of 3) may include a combination of the above described embodiments. According to various disclosed embodiments, the RRC layer of the base station may identify the flag received from the MAC layer for information on at least one of the PCell and SCell UL electric fields and the MR message received from the UE for information on at least one of the PCell and SCell DL electric fields.

In this case, the base station may transmit information controlling configuration of the UL SCC corresponding to the SCell to the UE based on at least one of PCell UL electric field information, PCell DL electric field information, SCell UL electric field information, or SCell DL electric field information.

For example, the base station may transmit information indicative of UL SCC deconfiguration to the UE for the case where at least one of the PCell UL electric field, PCell DL electric field, SCell UL electric field, or SCell DL electric field is weak.

According to various disclosed embodiments, a method is provided for avoiding a ping-pong effect occurring when a base station configures a UL SCC.

In a CA-based wireless communication system, there is a need of minimizing network signaling overhead caused by frequent state transitions occurring along with the ping-pong effect when a base station controls configuring, deconfiguring, and maintaining a UL SCC.

In the CA-based wireless communication system according to various disclosed embodiments, a difference (GAP) between a first reference threshold value for UL SCC configuration and a second reference threshold value for UL SCC deconfiguration that are set in the PCell is used in order to avoid occurrence of the ping-pong effect, when controlling UL SCC configuration, deconfiguration, and maintenance. For example, if the first reference threshold value (threshold1) is set to a value greater than that of the second reference threshold value (threshold2) as in the formula below, UL SCC configuration is triggered relatively less often than UL SCC deconfiguration, leading to a reduction of the occurrence of the ping-pong effect.

In the CA-based wireless communication system according to various disclosed embodiments, it may be possible to reduce the occurrence of the ping-pong effect, using a hysteresis scheme designed such that UL SCC configuration is triggered relatively less often than UL SCC deconfiguration, by setting PCell-related event_counter 1 for UL SCC configuration to a value greater than that of PCell-related event_counter2 for UL SCC deconfiguration.

threshold1>threshold2, counter1/2 value setting (Hysteresis)

According to various disclosed embodiments, a method for a base station to configure metric values for use in controlling UL CA SCC configuration, deconfiguration, and maintenance in a CA-based wireless communication system may be summarized as shown in Table 3.

TABLE 3

|  | PCell | SCell |
| --- | --- | --- |
| UL SCC configuration condition | Strong/moderate PCell UL electric field (TBS flag = 1) | Strong/moderate PCell UL electric field (TBS flag = 1) and SCell DL A1 MR basis |
| UL SCC deconfiguration condition | Weak PCell UL electric field (TBS flag = 0) | Weak PCell UL electric field (TBS flag = 0) or SCell DL 2A MR basis (A1 >> A2) |

In the CA-based wireless communication system according to various disclosed embodiments, the UL SCC configuration and deconfiguration operations may be performed based on PCell UL electric field information.

For example, the UL SCC configuration operation may be performed in consideration of at least one of the PCell UL electric field information or the SCell DL electric field information with the exception of the SCell UL electric field information.

TABLE 4

| | UL SCC config. conditions | | |
| --- | --- | --- | --- |
| Case | PCell UL | SCell DL | UL SCC config. operation |
| 1 | Strong/moderate electric field (TBS flag = 1) | Strong/moderate electric field (A1) | UL SCC configuration |
| 2 | Strong/moderate electric field (TBS flag = 1) | Weak electric field (No A1 MR) | NA |
| 3 | Weak electric field (TBS flag = 0) | Strong/moderate electric field (A1) | NA |
| 4 | Weak electric field (TBS flag = 0) | Weak electric field (No A1 MR) | NA |

According to various disclosed embodiments, a PCell UL electric field information-based UL SCC deconfiguration operation may be performed in a 2 CC UL CA environment.

Table 5 summarizes settings of the TBS flag in consideration of only the PCell UL electric field environment according to various embodiments, and Table 6 summarizes settings of the TBS flag in consideration of at least one of the PCell UL and SCell UL electric field environments according to various embodiments.

In Table 5, the TBS flag is set to 1 for the case where the PCell UL electric field is strong or moderate or 0 for the case where the PCell UL electric field is weak.

In Table 6, the TBS flag is set to 0 for the case where at least one of the PCell UL and SCell UL electric fields is weak or 1 for the case where both the PCell UL and SCell UL electric fields are not weak.

As shown in Table 5, the UL SCC deconfiguration operation may be performed based on at least one of PCell UL electric field information or SCell UL electric field information in the 2 CC UL CA environment.

As shown in Table 5, a UL SCC may be deconfigured for the case where at least one of the PCell UL and SCell UL electric fields is weak.

TABLE 5

| Case | PCell UL | SCell UL | SCell DL | UL SCC deconfig. operation | Ping-Pong possibility |
|---|---|---|---|---|---|
| 1 | Strong/moderate electric field (TBS flag = 1) | | Strong/moderate electric field (No A2 MR) | (maintain 2 CC UL CA) | NA |
| 2 | Strong/moderate electric field (TBS flag = 1) | | Weak electric field (A2) | UL SCC deconfiguration | A1 > A2, NA |
| 3 | Weak electric field (TBS flag = 0) | | Strong/moderate electric field (No A2 MR) | UL SCC deconfiguration | Weak PCell UL electric field, NA |
| 4 | Weak electric field (TBS flag = 0) | | Weak electric field (A2) | UL SCC deconfiguration | Weak PCell UL electric field, A1 > A2, NA |

As shown in Table 6, the UL SCC deconfiguration operation may be performed based on at least one of PCell UL electric field information, SCell UL electric field information, or SCell DL electric field information in the 2 CC UL CA environment.

As shown in Table 6, a UL SCC may be deconfigured for the case where at least one of the PCell UL electric field, SCell UL electric field, or SCell DL electric field is weak.

As in case 3 in Table 6, after UL SCC deconfiguration, if UL SCC configuration is performed, the ping-pong effect is likely to occur.

According to various disclosed embodiments, it may be possible to deal with case 3 in Table 6 as an exception and use at least one of two methods as follows to avoid occurrence of the ping-pong effect in the CA-based wireless communication system.

1) A method of setting the TBS flag in consideration of only the PCell UL electric field environment.

2) A method of setting the TBS flag in consideration of the PCell or SCell electric field environment and allowing configuration of the corresponding UL SCC after expiry of a timer starting upon deconfiguration of the corresponding UL SCC.

TABLE 6

| Case | PCell UL | SCell UL | TBS flag (= 0 for weak PCell or SCell electric field | SCell DL | UL SCC deconfig. operation | Ping-Pong possibility |
|---|---|---|---|---|---|---|
| 1 | Strong/moderate electric field | Strong/moderate electric field | TBS flag = 1 | Strong/moderate electric field (No A2 MR) | (maintain 2 CC UL CA) | NA |
| 2 | Strong/moderate electric field | Strong/moderate electric field | TBS flag = 1 | Weak electric field (A2) | UL SCC deconfiguration | A1 > A2, No PP |
| 3 | Strong/moderate electric field | Weak electric field | TBS flag = 0 | Strong/moderate electric field (No A2 MR) | UL SCC deconfiguration | PP |
| 4 | Strong/moderate electric field | Weak electric field | TBS flag = 0 | Weak electric field (A2) | UL SCC deconfiguration | A1 > A2, No PP |
| 5 | Weak electric field | Strong/moderate electric field | TBS flag = 0 | Strong/moderate electric field (No A2 MR) | UL SCC deconfiguration | Weak PCell UL electric field, No PP |
| 6 | Weak electric field | Strong/moderate electric field | TBS flag = 0 | Weak electric field (A2) | UL SCC deconfiguration | A1 > A2, No PP, Weak PCell electric field |
| 7 | Weak electric field | Weak electric field | TBS flag = 0 | Strong/moderate electric field (No A2 MR) | UL SCC deconfiguration | Weak PCell electric field, No PP PCell |
| 8 | Weak electric field | Weak electric field | TBS flag = 0 | Weak electric field (A2) | UL SCC deconfiguration | A1 > A2, No PP, Weak PCell electric field |

In the CA-based wireless communication system according to various disclosed embodiments, a method for transmitting/receiving information controlling configuration of a UL SCC corresponding to an SCell determines a PCell UL electric field.

In the CA-based wireless communication system according to various disclosed embodiments, a base station may configure a UL CA configuration mode in separation from a DL CA mode and support a UL SCC configuration operation based on whether a Pscell electric field is strong even in a CA blind addition mode.

In the CA-based wireless communication system according to various disclosed embodiments, the UL SCC configuration operation may be performed based on at least one of the PCell UL electric field environment, PCell DL electric field environment, or SCell DL electric field environment.

In the CA-based wireless communication system according to various disclosed embodiments, it may be possible to initiate a UL SCC selection or configuration operation for configuring a UL SCC when the PCell UL electric field is strong (TBS flag=1) in the UL CA SCell configuration mode.

For example, a strong UL electric field determinant metric may be at least one of SINR, PHR, or TBS information.

In the CA-based wireless communication system according to various disclosed embodiments, it may be possible to initiate a UL SCC selection or configuration operation for configuring a UL SCC when the PCell DL electric field is strong (receipt of A1 MR) in the UL SCC configuration mode.

In the CA-based wireless communication system according to various disclosed embodiments, it may be possible to initiate a UL SCC selection operation for configuring a UL SCC when both the PCell UL and DL electric fields are strong or intermediate (TBS flag=1 & receipt of A1 MR) in the UL SCC configuration mode.

In the CA-based wireless communication system according to various disclosed embodiments, it may be possible to perform a UL SCC deconfiguration operation based on at least one of the PCell UL electric field environment, PCell DL electric field environment, SCell UL electric field environment, or SCell DL electric field environment.

In the CA-based wireless communication system according to various disclosed embodiments, it may be possible to perform the UL SCC deconfiguration operation when the PCell UL electric field is weak (TBS flag=0) in the UL CA SCell deconfiguration mode.

For example, a weak electric field determinant metric may be at least one of SINR, PHR, or TBS information.

In the CA-based wireless communication system according to various disclosed embodiments, it may be possible to perform the UL SCC deconfiguration operation when the SCell UL electric field is weak (TBS flag=0) in the UL CA SCell deconfiguration mode.

In the CA-based wireless communication system according to various disclosed embodiments, it may be possible to perform the UL SCC deconfiguration operation when the PCell DL electric field is weak (receipt of A2 MR) in the UL CA SCell deconfiguration mode.

In the CA-based wireless communication system according to various disclosed embodiments, it may be possible to perform the UL SCC deconfiguration operation when the SCell DL electric field is weak (receipt of A2 MR) in the UL CA SCell deconfiguration mode.

In the CA-based wireless communication system according to various disclosed embodiments, it may be possible to perform the UL SCC deconfiguration operation when both the PCell UL and DL electric fields are weak in the UL CA SCell deconfiguration mode.

Figure 10:
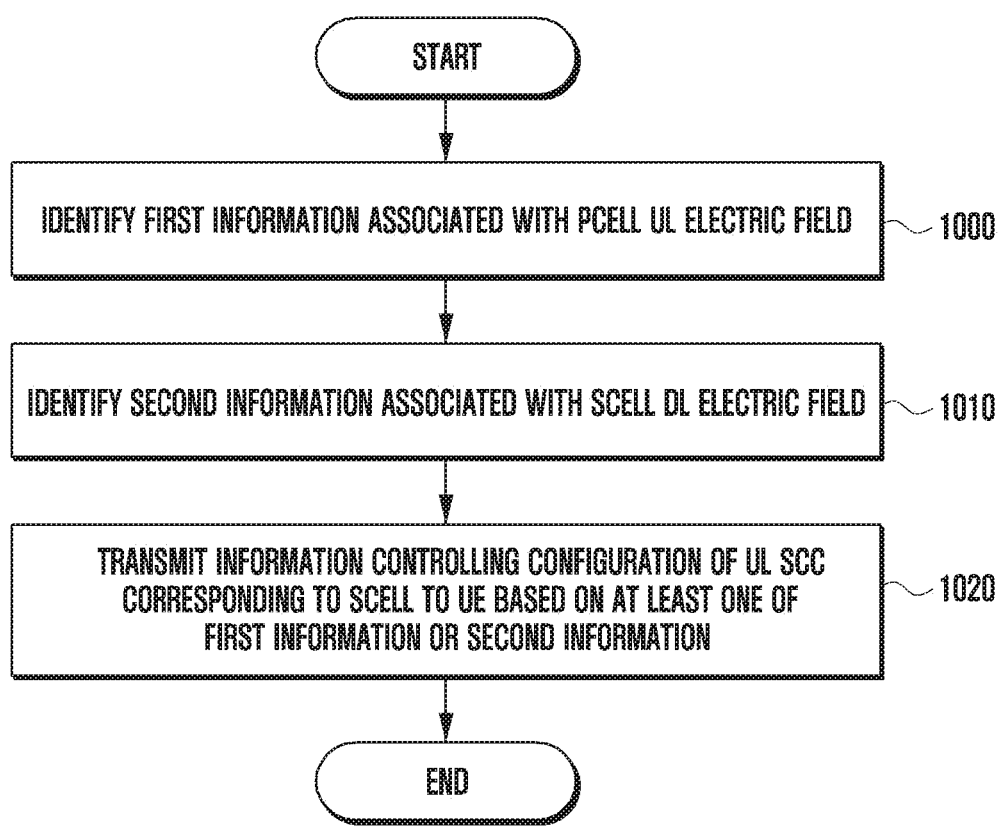
FIGS. 10 and 11 are flowcharts illustrating procedures for a base station to transmit information configuring a UL SCC corresponding to an SCell according to various embodiment of the disclosure.
Figure 11:
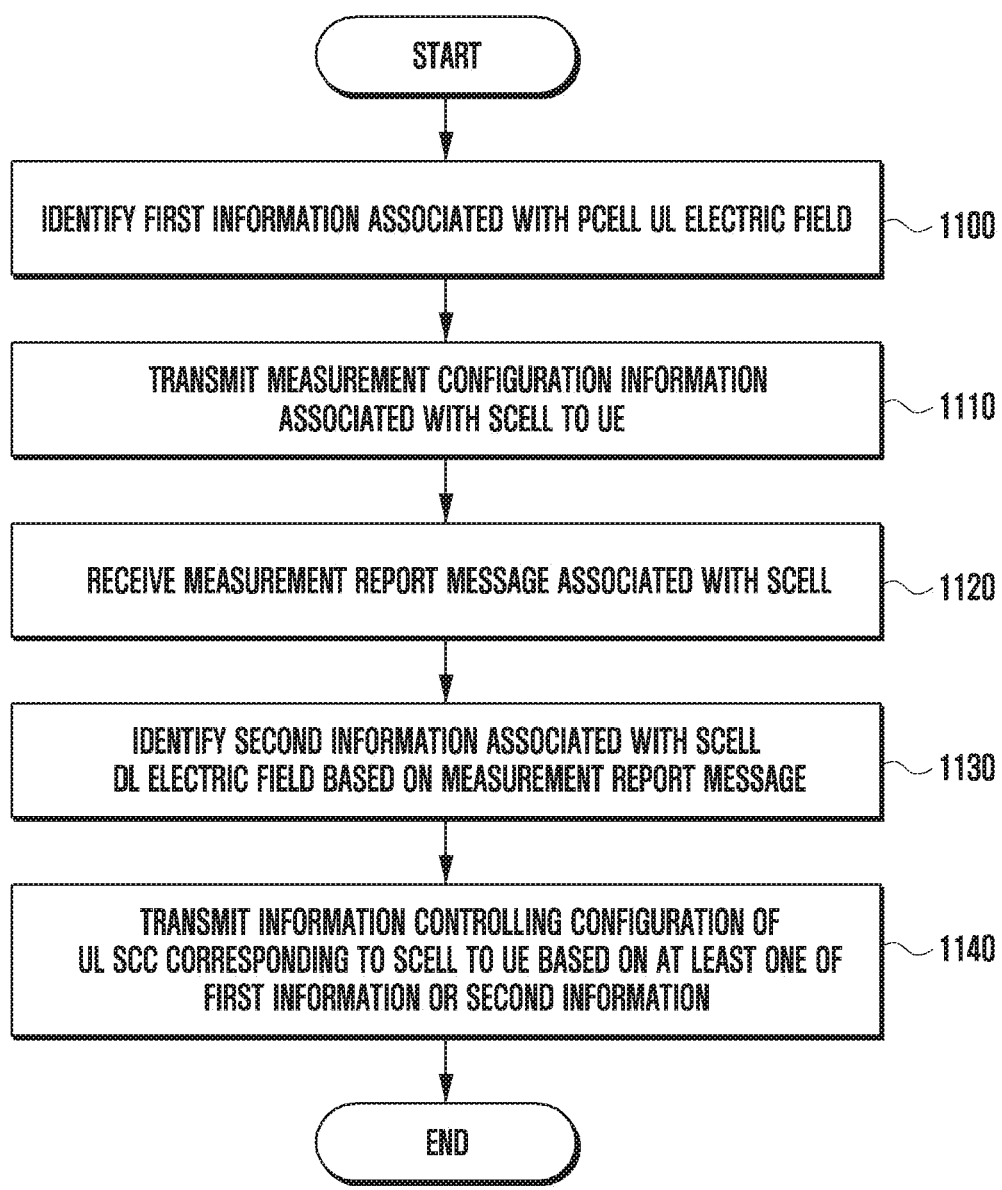

FIGS. 10 and 11 are flowcharts illustrating procedures for a base station to transmit information configuring a UL SCC corresponding to an SCell according to various embodiments of the disclosure.

Referring to FIG. 10, at operation 1000, the base station may identify first information on the PCell UL electric field.

For example, the first information may indicate a PCell UL electric field strength that is strong, moderate, or weak.

For example, the first information may be obtained based on at least one of SINR information, PHR information, or TBS information received from a UE.

At operation 1010, the base station may identify second information on an SCell DL electric field.

For example, the second information may indicate an SCell DL electric field strength that is strong, moderate, or weak.

For example, the second information may be obtained based on an SCell-related MR message received from the UE.

At operation 1020, the base station may transmit information controlling configuration of the UL SCC corresponding to the SCell based on at least one of the first information or second information.

For example, the information controlling configuration of the UL SCC may include at least one of information indicative of UL SCC configuration, information indicative of preventing UL SCC configuration, or information indicative of UL SCC deconfiguration.

For example, if at least one of the first information or the second information is indicative of a weak electronic field, the UL SCC configuration control information may include information indicative of preventing configuration of a UL of the SCell.

For example, if neither the first information nor the second information is indicative of a weak electric field, the UL SCC configuration control information may include information indicative of configuring a UL SCC of the SCell.

Referring to FIG. 11, FIG. 11 depicts a flowchart illustrating a procedure for a base station to acquire SCell DL electric field information based on an MR message, according to various embodiments of the disclosure.

Operations 1100 to 1140 correspond respectively to operations 1000 to 1020 of FIG. 10; thus, detailed descriptions thereof are omitted herein.

Meanwhile, operation 1010 of FIG. 10 may include operations 1110 to 1130 of FIG. 11.

At operation 1100, the base station may identify first information on the PCell UL electric field.

The base station may transmit measurement configuration information for an SCell to the UE at operation 1110, receive an MR message for the SCell from the UE at operation 1120, and obtain second information on an SCell DL electric field at operation 1130 based on the MR message.

At operation 1140, the base station may transmit information controlling configuration of a UL SCC of the SCell based on at least one of the first information or the second information.

Figure 12:
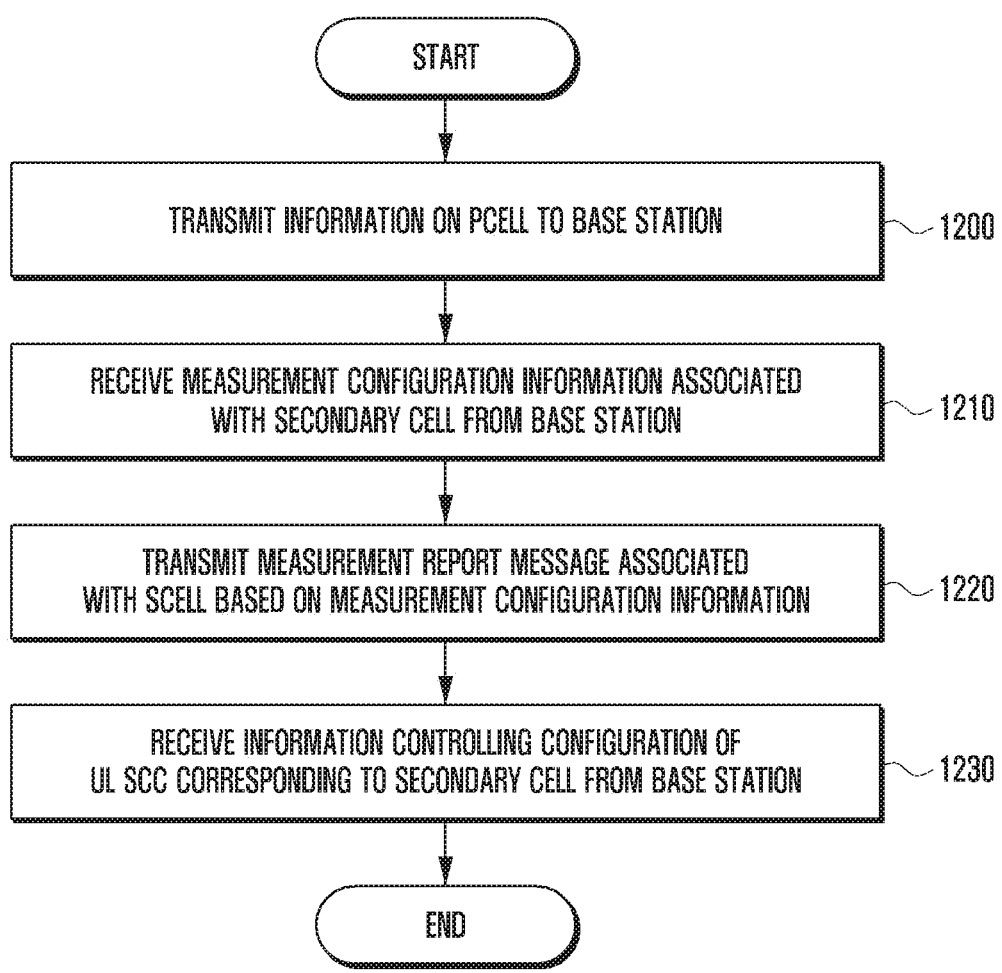
FIG. 12 is a flowchart illustrating a procedure for a user equipment (UE) to receive information controlling configuration of a UL SCC corresponding to an SCell according to an embodiment of the disclosure.

FIG. 12 is a flowchart illustrating a UE to receive information controlling configuration of a UL SCC corresponding to an SCell according to an embodiment of the disclosure.

Referring to FIG. 12, at operation 1200, the UE may transmit information on the PCell to a base station.

The information on the PCell may include at least one of information on SINR, information on PHR, or information on TBS.

The base station may acquire first information on the PCell UL electric field from the information on the PCell. For example, the first information is indicative of a PCell UL electric field strength that is strong, moderate, or weak.

That is, the first information is the information that the base station acquires from the PCell UL electric field strength-indicative information transmitted by the UE.

At operation 1210, the UE may receive measurement configuration information for an SCell from the base station.

At operation 1220, the UE may transmit an MR message for the SCell based on the measurement configuration information.

At operation 1230, the UE may receive information controlling configuration of a UL SCC corresponding the SCell.

Examples of the information controlling configuration of a UL SCC may include information indicative of configuring a UL SCC, information indicative of preventing configuration of a UL SCC, and information indicative of deconfiguring a UL SCC.

For example, the UL SCC configuration control information is generated based on the first information on the PCell UL electric field or the second information on the SCell DL electric field.

In this case, the base station acquires the second information based on the MR message received from the UE.

For example, the second information is indicative of an SCell DL electric field strength that is strong, moderate, or weak.

For example, if at least one of the first information or the second information is indicative of the weak electric field strength, the UL SCC configuration control information may indicate preventing configuration of a UL SCC.

For example, if neither the first information nor the second information is indicative of the weak electric field strength, the UL SCC configuration control information may indicate configuring a UL SCC corresponding to the SCell.

Figure 13:
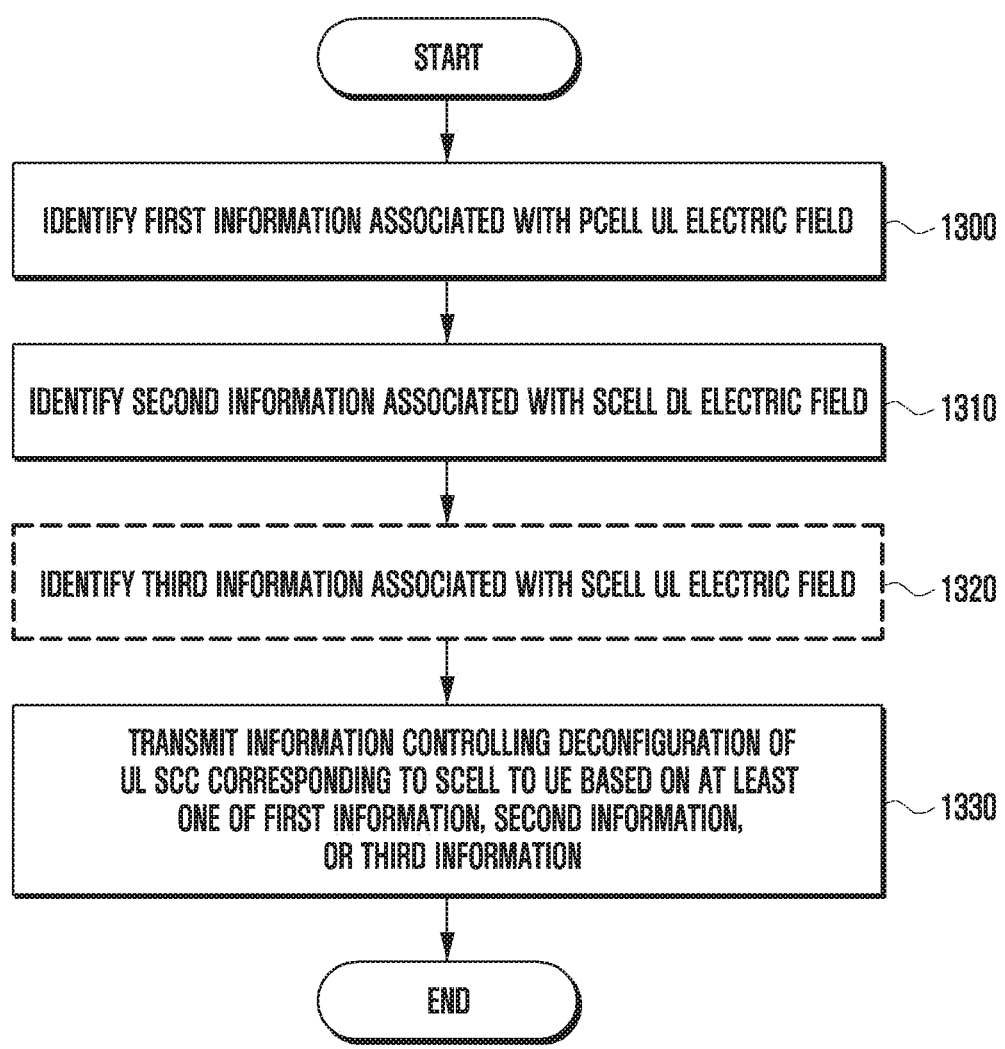
FIGS. 13 and 14 are flowcharts illustrating procedures for a base station to transmit information controlling deconfiguration of a UL SCC corresponding to an SCell according to various embodiments of the disclosure.
Figure 14:
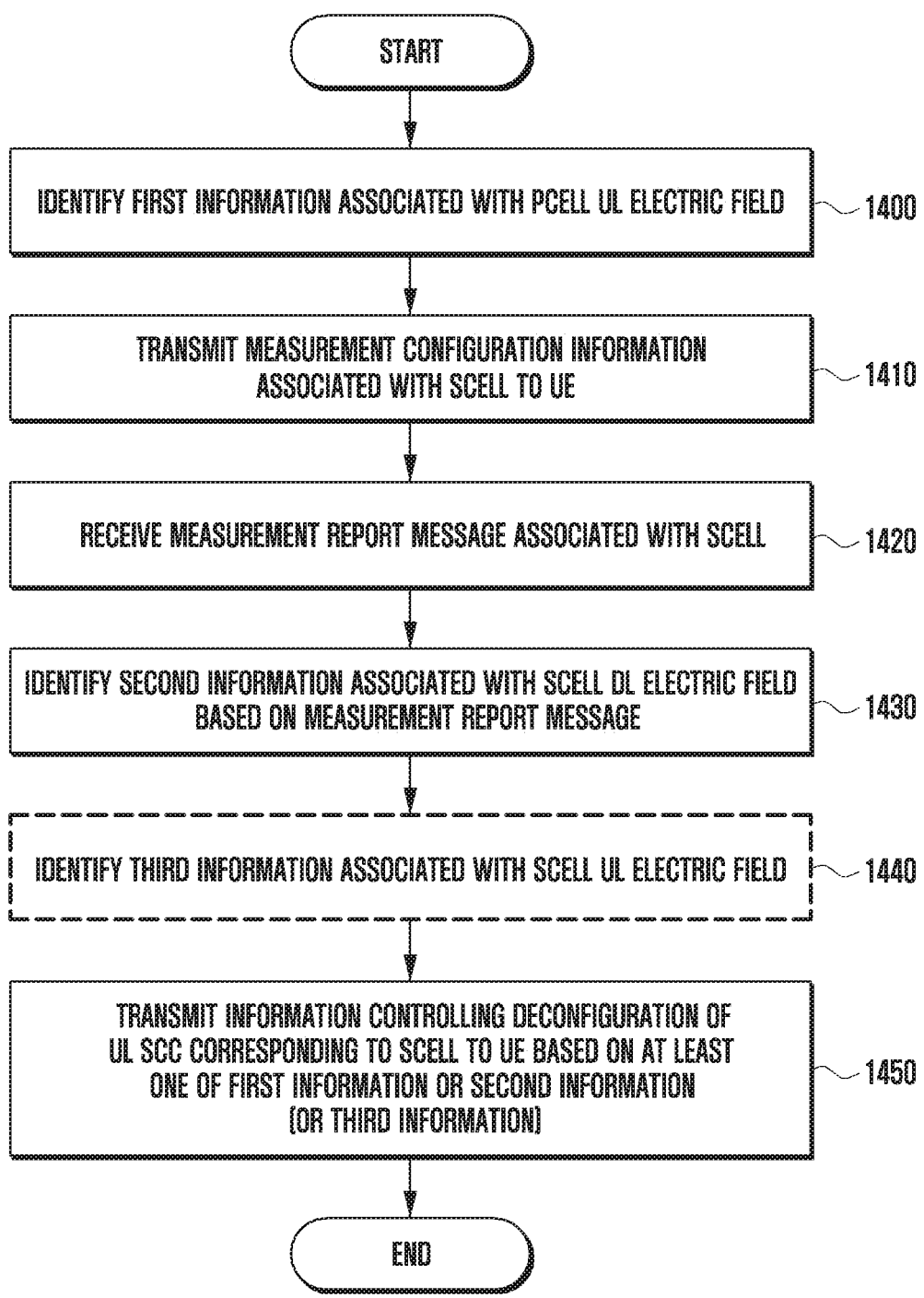

FIGS. 13 and 14 are flowcharts illustrating procedures for a base station to transmit information controlling deconfiguration of a UL SCC corresponding to an SCell according to various embodiments of the disclosure.

Referring to FIG. 13, operations 1300 and 1310 correspond respectively to operations 1000 and 1010 of FIG. 10; thus, detailed descriptions thereof are omitted herein.

At operation 1300, the base station may identify first information on a PCell UL electric field.

At operation 1310, the base station may identify second information on an SCell DL electric field.

At operation 1320, the base station may identify third information on an SCell UL electric field.

For example, if a UL SCC corresponding to the SCell is configured to a UE, the base station may receive information on the SCell.

For example, the third information may indicate an SCell UL electric field strength that is strong, moderate, or weak.

According to various disclosed embodiments, the third information on the SCell UL electric field may be obtained based on at least one of SINR information, PHR information, or TBS information.

At operation 1330, the base station may transmit information controlling configuration of a UL SCC corresponding to the SCell based on at least one of the first information or the second information.

The base station may identify the third information on the SCell UL electric field at operation 1320 and transmit information controlling configuration of a UL SCC corresponding to the SCell to the UE at operation 1330 based on at least one of the first information, second information, or third information.

Examples of the UL SCC configuration control information may include at least one of information indicative of configuring a UL SCC, information indicative of preventing configuration of a UL SCC, or information indicative of deconfiguring a UL SCC.

For example, if at least one of the first information, the second information, or the third information is indicative of a weak electric field, the UL SCC configuration control information may indicate deconfiguring the UL SCC of the SCell.

Referring to FIG. 14, FIG. 14 depicts a flowchart illustrating a procedure for a base station to acquire information on SCell DL electric field based on an MR message.

Operations 1400, 1440, and 1450 correspond to operations 1300, 1320, and 1330, respectively; thus, detailed descriptions thereof are omitted herein.

Referring to FIG. 13, operation 1310 may include operations 1410 to 1430 of FIG. 14.

At operation 1400, the base station may identify first information on a PCell UL electric field.

The base station may transmit SCell measurement configuration information to the UE at operation 1410, receive an MR message for the SCell from the UE at operation 1420, identify the second information on the SCell DL electric field based on the MR message at operation 1430, and identify the third information on the SCell UL electric field at operation 1440.

At operation 1450, the base station may transmit information controlling deconfiguration of the UL SCC of the SCell based on at least one of the first information or the second information.

After identifying the third information on the SCell UL electric field at operation 1440, the base station may transmit, at operation S1450, information controlling configuration of the UL SCC of the SCell based on at least one of the first information, second information, or third information.

For example, the UL SCC configuration control information may include at least one of the information configuring a UL SCC, information preventing configuration of a UL SCC, or information deconfiguring a UL SCC.

For example, if at least one of the first information, second information, or the third information is indicative of a weak electric field, the UL SCC configuration control information may include information deconfiguring the UL SCC of the SCell.

Figure 15:
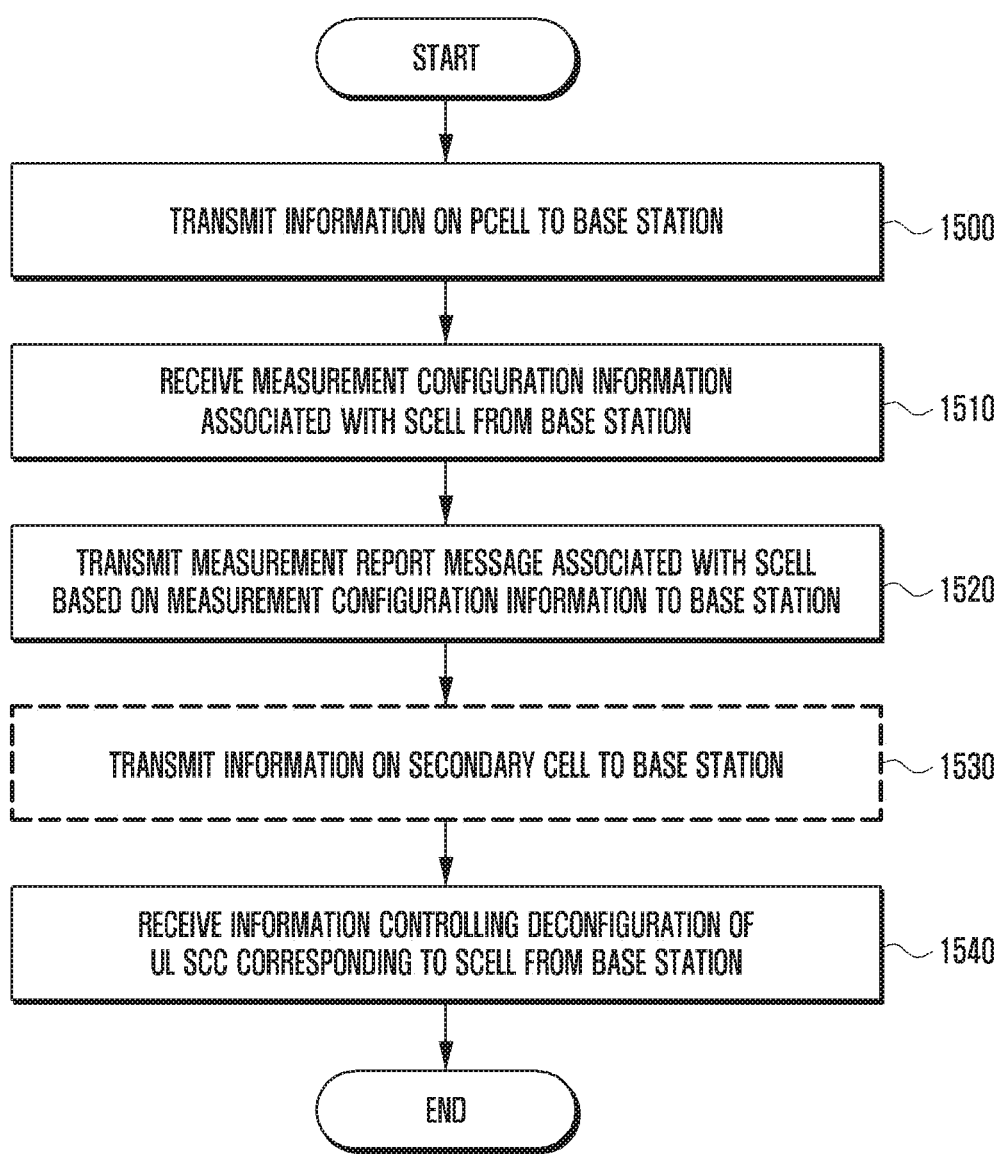
FIG. 15 is a flowchart illustrating a procedure for a UE to receive information controlling deconfiguration of a UL SCC corresponding to an SCell according to an embodiment of the disclosure.

FIG. 15 is a flowchart illustrating a procedure for a UE to receive information controlling deconfiguration of a UL SCC corresponding to an SCell according to an embodiment according to various embodiments of the disclosure.

Referring to FIG. 15, operations 1500 to 1520 correspond respectively to operations 1200 to 1220 of FIG. 12; thus, detailed descriptions thereof are omitted herein.

At operation 1500, the UE may transmit information on the PCell to a base station.

At operation 1510, the UE may receive SCell measurement configuration information from the base station.

At operation 1520, the UE may transmit an SCell MR message to the base station based on the measurement configuration information.

At operation 1530, the UE may transmit information on the SCell to the base station.

For example, if a UL SCC corresponding to the SCell is configured, the UE may transmit the information on the SCell to the base station.

In this case, the information on the SCell may include at least one of information on SINR, information on PHR, or information on TBS.

For example, the base station may acquire the third information on the SCell UL electric field from the information on the SCell. For example, the third information is indicative of an SCell UL electric field strength that is strong, moderate, or weak.

That is, the third information is the information that the base station acquires from the SCell UL electric field strength-indicative information transmitted by the UE.

At operation 1540, the UE may receive information controlling configuration of the UL SCC corresponding to the SCell from the base station.

For example, if a UL SCC corresponding to the SCell is configured to the UE, the UE may receive information controlling configuration of the UL SCC corresponding to the SCell from the base station, the UL SCC configuration control information being generated based on at least one of the first information, second information, or third information.

For example, the UL SCC configuration control information may include at least one of information configuring a UL SCC, information preventing configuration of a UL SCC, or information deconfiguring a UL SCC.

For example, if at least one of the first information, second information, or third information is indicative of a weak electric field, the UL SCC configuration control information may include information deconfiguring the UL SCC corresponding to the SCell.

Figure 16:
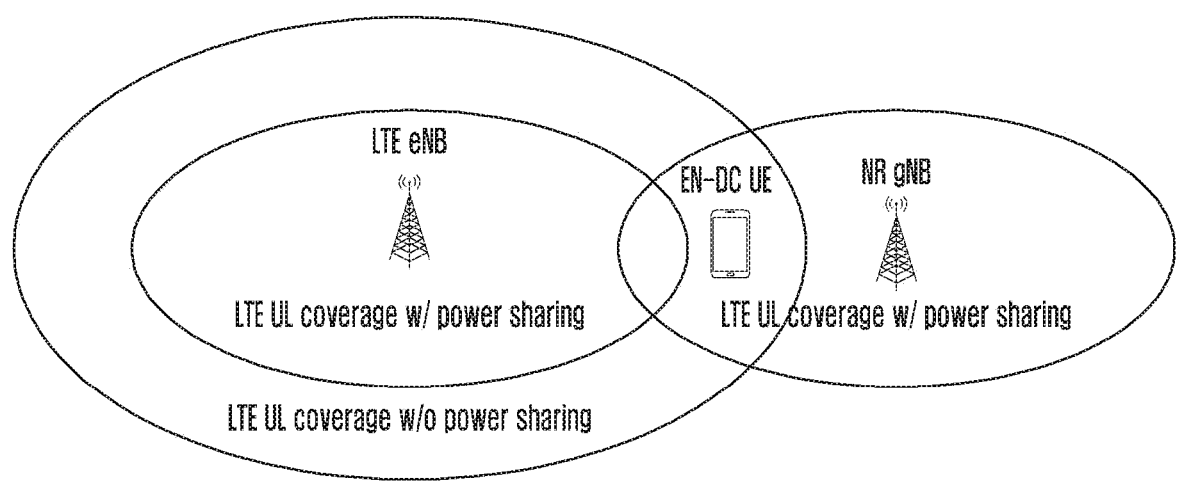
FIG. 16 is a diagram illustrating an EN-DC system according to an embodiment of the disclosure.

FIG. 16 is a diagram illustrating an EN-DC system according to embodiment of the disclosure.

Referring to FIG. 16, according to various embodiments of the disclosure, a wireless communication system for interworking among multiple communication system networks is proposed to support inter-technology or inter-frequency band operation (multi-RAT interworking). In the disclosure, the system for supporting interworking of heterogeneous communication networks may include UEs, radio access networks, and multiple core networks (CNs).

In the disclosure, a UE may be a multi-technology enabled UE supporting a 4G radio communication technology (E-UTRA), an evolved 4G radio access technology (evolved E-UTRA), and a 5G radio access technology (New Radio (NR)).

In the disclosure, a radio access network may support multiple radio access technologies (RATs) and interworking among heterogeneous technologies or frequency bands (multi-RAT interworking).

For example, a new radio access network (RAN) may support all RATs including the 4G RAT (E-UTRA), evolved 4G RAT (evolved E-UTRA), and 5G RAT (New Radio (NR)).

In the following description, the terms "RAN", "base station", and "network node" may be interchangeably used with the same meaning; examples of the base station may include a 5G NR base station (gNB) using the 5G NR technology, a 4G base station (LTE-eNB) using the E-UTRA technology, and an evolved 4 base station (eLTE eNB) using the evolved E-UTRA technology. A base station (eLTE eNB) may support the 4G and 5G RATs simultaneously.

The EN-DC system is a system that has a 4G (E-UTRA) base station and a 5G (NR) base station connected to a 4G CN.

In the EN-DC system, the 4G base station may act as a master base station (master node (MN) or MeNB) for processing control signals, and the 5G base station may act as a secondary base station (secondary node (SN) or SgNB) for processing data based on a control signal received from the MeNB.

In the disclosed EN-DC system, the terms "master base station", "master node (MN)", and "master eNB (MeNB)" are interchangeably used with the same meaning; the terms "secondary base station", "secondary node (SN)", and "secondary gNB (SgNB)" have the same meaning.

In the disclosed EN-DC system, a UE may connect to an eNB operating as the master base station and an en-gNB operating as the secondary base station.

The eNB may connect to an EPC via an S1 interface and the en-gNB via an X2 interface, and the en-gNB may connect to the EPC via the S1 interface. The en-gNB may connect to the EPC via an X2-U interface or an S1-U interface and another en-gNB.

The above described operation for performance enhancement of the UL CA in a weak electric field environment may include an operation of releasing a secondary node (SN) in a weak electric field situation of the LTE UL as the PCell of the EN-DC system.

For example, power sharing in the EN-DC mode may decrease the maximum transmit power (max. tx power) and UL coverage in the LTE network as master node.

For example, an EN-DC UE connected to an LTE network as master node with a weak electric field and an NR network as secondary node with a strong electric field may experience a key performance indicator (KPI) decrease caused by a power sharing operation. In the EN-DC-based wireless communication system according to various disclosed embodiments, if the NR network has a weak electric field, the LTE network as master node may perform an MR-based SN release operation.

In the EN-DC-based wireless communication system according to various disclosed embodiments, the LTE network as master node may perform an SN addition operation only when the LTE UL electric field is not weak in consideration of power sharing.

In the EN-DC-based wireless communication system according to various disclosed embodiments, the LTE network as master node may perform an SN release operation only when the LTE UL electric field is weak in consideration of power sharing.

According to various disclosed embodiments, the base station may sort the UEs that need UL CA to be applied in a weak electric field environment into a high power UE (HPUE) group of UEs with UE power class 1, which are free from a weak electric field environment, and a non-HPUE group based on UE power class information.

Examples of the HPUE may include a special class UE operating in an LTE network.

In LTE standard Release 11, the 3GPP introduced HPUE in band 14 (700 MHz). As opposed to legacy UEs that are allowed to transmit at a maximum output power of 23 dBm, the HPUEs are allowed to transmit with an output power of up to 31 dBm.

Given that the transmit power of the higher power UE determines the transmission range, the cell coverage is increased from 4 Km to 8 Km, leading to a broader coverage with the same number of eNBs, which provides a basis of assumption that no weak electric field situation occurs for the high power UE in the disclosed embodiments.

In this regard, it may be possible to release the weak UL electric field environment condition of the MN base station in association with the HPUEs based on the UE capability information in the EN-DC system. That is, the SN addition condition is not applied only when the LTE UL electric field is not weak. In the EN-DC-based wireless communication system, the LTE network as master node does not perform the MR-based SN release operation in the NR network when the NR network has a weak electric field.

The above-described UL weak electric field judgment (A2 MR-based) operation may become a basis of an SgNB Release operation and SgNB Addition delay control.

An alternative embodiment is directed to a UL path switching control method that is capable of overcoming a UL performance degradation in a weak electric field environment for the case of option 3x (SN terminated split bearer) even when an SgNB is added in the EN-DC system.

If it is detected that the NR UL electric field is weak based on the receipt of NR A2 MR or at least one of SINR information, PHR information, or TBS information, the base station may configure an MCG bearer as the UL primary path for option 3x (SN terminated split bearer).

In contrast, if it is detected that the NR UL electric field is moderate/strong based on the receipt of NR A1 MR or at least one of SINR information, PHR information, or TBS information, the base station may configure an SCG bearer as the UL primary path for option 3x (SN terminated split bearer).

In this configuration method, "primary path" of the more-thanOneRLC information element (IE) in PDCP-config is set to MCG (weak electric field) or SCG (moderate/strong electric field) in an NR RRC reconfiguration procedure. In this configuration method, "ul-DataSplitThreshold" is set to infinite in order to indicate that UL transmission is allowed over one bearer selected as the primary path between MCG and SCG bearers of option 3x (SN terminated split bearer).

Although the description is directed to option 3x (SN terminated split bearer) in the EN-DC system, the proposed method includes an operation of controlling SN release or addition and SN measurement configuration termination or delay based on a weak electric field environment judgement in a system supporting a DC such as MR-DC ((NG) EN-DC, NR-DC, and NE-DC). The proposed method may also include an operation of terminating/delaying SN addition or release control in a moderate/strong electric field environment.

Although the description is directed to option 3x (SN terminated split bearer) in the EN-DC system, the proposed method includes an operation of controlling each of some or all of SRBs or DRBs or all SRBs and DRBs based on a weak electric field environment judgement.

The proposed method also includes a control operation for configuring each of some or all of SRBs or DRBs or all SRBs and DRBs as UL path(s) based on a weak electric field environment judgement in a split bearer structure.

According to various disclosed embodiments, a method for facilitating a UL SCC change operation of a base station in the CA-based wireless communication system is provided.

According to various disclosed embodiments, a method is provided for minimizing network signaling overhead caused by frequent state transitions occurring along with the ping-pong effect when a base station controls configuring, deconfiguring, and maintaining a UL SCC in the CA-based wireless communication system.

Figure 17:
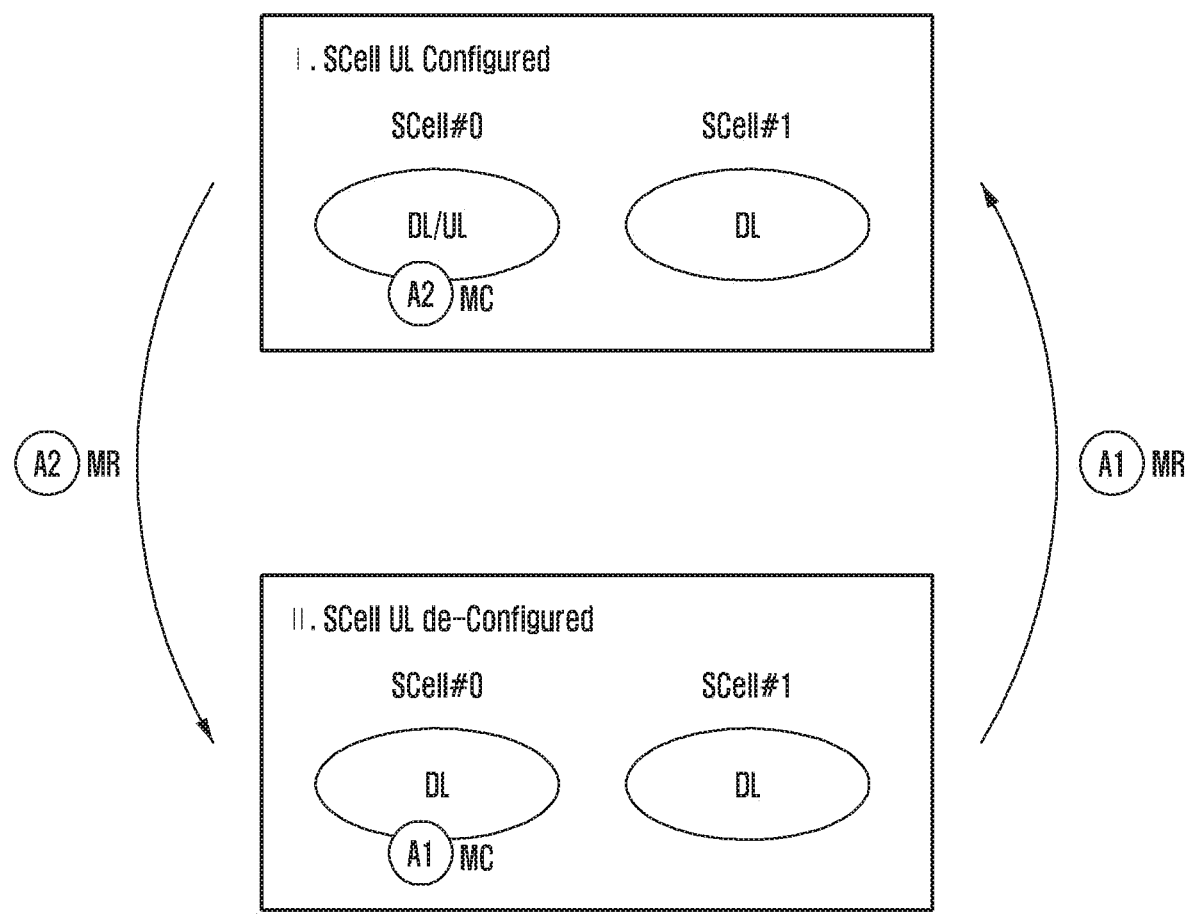
FIG. 17 is a conceptual diagram illustrating a UL SCC change operation of a base station according to an embodiment of the disclosure.

FIG. 17 is a conceptual diagram illustrating a UL SCC change operation of a base station according to an embodiment of the disclosure.

Referring to FIG. 17, according to various disclosed embodiments, in the situation where the UL CA is configured, the base station may configure an A2 event for a UL SCC preconfigured to a UE.

The base station may monitor the corresponding cell to detect whether a condition that an electric field becomes equal to or less than a threshold is fulfilled and, if the condition is fulfilled, it may deconfigure a corresponding UL SCC based on an A2 MR, select the best DL SCC among DL SCC candidates configured to the UE, and change the old UL SCC to an new UL SCC associated with the selected DL SCC. That is, a UL SCC is configured to an SCell corresponding to the selected DL SCC.

First, the UE may receive measurement configuration information from the base station. In the following description, a message including the measurement configuration information is referred to as a measurement configuration message. The UE may perform measurement based on the measurement configuration information. If a measurement result fulfils a reporting condition included in the measurement configuration information, the UE may report the measurement result to the base station. In the following description, a message including the measurement result is referred to as a measurement report message.

For example, the reporting condition may include an event that triggers reporting of the measurement result and periodicity information.

As described above, the UE may report the measurement result in an event-triggered manner That is, the measurement result is reported upon the occurrence of a predetermined event. The event is predetermined per cell. For example, an event may be designated for a serving cell, a neighboring cell, a PCell, an SCell, or a combination thereof. An SCell is basically treated as a serving cell and, in association with a specific event, as a neighboring cell.

In 3GPP LTE, a base station may configure only one measurement target to a UE in a frequency band. 3GPP TS 36.331 specifies events triggering an MR as shown in Table 7.

TABLE 7

A1/A2 event definition and use case summary (3GPP LTE RRC, TS 36.331, NR RRC TS 38.331)

| Event | Description | Example |
|---|---|---|
| A1 | Serving becomes better than threshold | Cell configuration |
| A2 | Serving becomes worse than threshold | Cell deconfiguration |

In reference to Table 7, event A1 is that the channel condition of the serving cell is better than a threshold, and event A2 is that the channel condition of the serving cell is worse than a threshold.

If the measurement result at the UE fulfils one of the events (quality MR level) configured as above, the UE may transmit an MR message to the base station.

Figure 18:
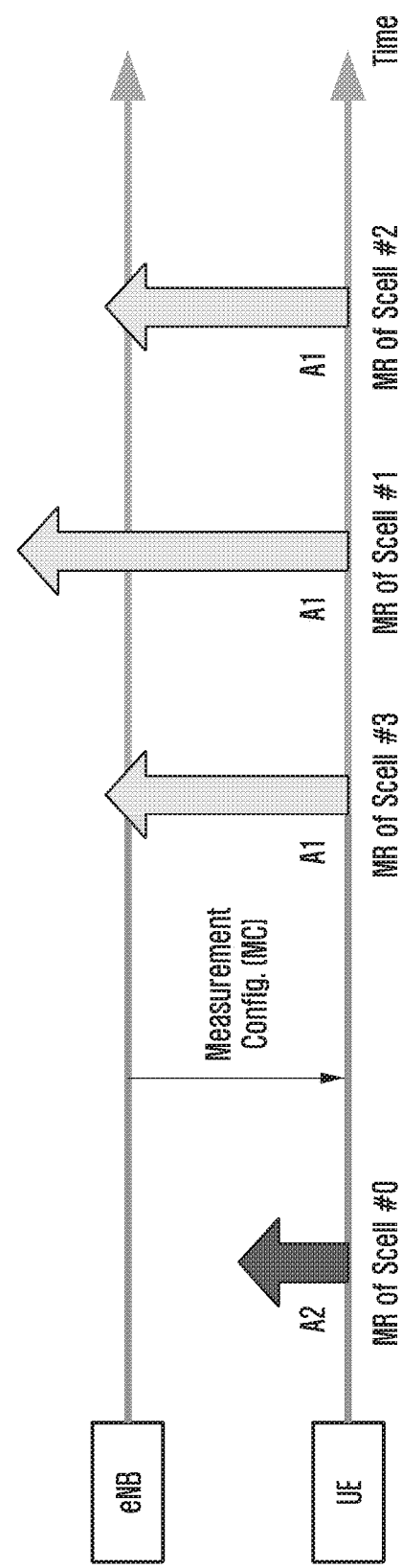
FIG. 18 is a conceptual diagram illustrating an operation for a base station to receive per-SCell MR messages from a UE according to various an embodiment of the disclosure.

FIG. 18 is a conceptual diagram for explaining a UL CA SCC change procedure in which a base station detecting an A2 event on a preconfigured UL SCC performs measurement configuration (MC) to a UE and receives a per-SCC A1 MR from the UE according to an embodiment of the disclosure.

FIG. 18 is a conceptual diagram illustrating an operation for a base station to receive per-SCell MR messages from a UE according to embodiment of the disclosure.

Referring to FIG. 18, in a basic UL CA SCC change procedure, the base station may transmit A2 MC to the UE upon occurrence of the A2 event on a previously configured UL SCC, and the UE may transmit per-SCC candidate A1 MRs.

Referring to FIG. 18, upon occurrence of the A2 event on a previously configured UL SCC, the UE may transmit an A2 MR to the base station.

The base station may transmit measurement configuration (MC).

For example, the base station may configure the A1 measurement event for one or more DL SCell carriers available for CA during a UL CA SCell selection procedure.

The UE may transmit per-SCC candidate A1 MRs to the base station upon occurrence of the preconfigured A1 event.

For example, when the A1 event configured by the base station occurs, the UE may perform measurement per SCC candidate and transmit A1 MRs including per-SCC candidate measurement results.

In the above operation, L3 filtering may be performed as configured by the base station, and L1 filtering may be performed according to a UE's implementation.

For example, the UE may perform L1 filtering and L3 filtering in order to compute an MR value based on at least one of reference signal received power (RSRP), reference signal received quality (RSRQ), or signal to interference and noise ratio (SINR).

For L3 filtering, the base station may configure a coefficient for use by the UE in the computation.

According to 3GPP TS 36.331, the computation may be performed with a weighted sum of a value obtained before an L3 MR and a new L1 MR value. For example, the computation may be performed using equation $F_n=(1-a)\cdot F_{n-1}+a\cdot M_n$, in which the weight factor "a" may be substituted by an L3 filter coefficient.

As aforementioned, L1 filtering may be performed according to the UE's implementation. For example, a measurement interval for an MR and whether to report an instantaneous value or an average value may be configured according to the UE's implementation.

Accordingly, when the UE transmits per-SCC candidate A1 MRs, a problem may arise in that it is not easy for the base station to control the order and times of per-SCC MR calculations.

Assuming a 5 CC CA environment in which a UE performs calculations to generate MRs in the order of indices CC_1, CC_2, CC_3, CC_4, and CC_5, even when it is determined to transmit A1 MRs for all CCs because the measurement values for the all SCCs (e.g., RSRP, RSRQ, and SINR) are equal to or greater than a threshold allowing transmission of A1 MR, the UE may transmit the A1 MR for CC_1, which allows the base station to configure UL SCC change based on the A1 MR for CC_1 that is first received. If the base station performs UL SCC change based only the A1 MR for CC_1, this may raise a problem in that all per-SCC channel conditions are not fairly reflected.

In the CA-based wireless communication system according to various disclosed embodiments, the UE that cannot perform the MR computation simultaneously for multiple CCs may determine the order of CCs (being each identified by an index CC_i) for which the UE calculates MRs and transmit the MRs to the base station with various methods as follows.

Method 1) Transmitting in a fixed order such as a fixed index order to the base station.

Method 2) Transmitting in a randomly selected order to the base station.

Method 3) Transmitting in a broadest bandwidth SSC-first order to the base station.

Method 4) Transmitting in a least UEs-allocated SCC-first order to the base station.

Method 5) Transmitting in a broadest per-UE-bandwidth-allocated SCC-first order to the base station.

In the CA-based wireless communication system according to various disclosed embodiments, a UE may compute and transmit per-CC MRs in an order determined according to a combination of at least two of the above methods.

Given that per-SCC channel conditions are not predictable, a problem may arise in that channel condition varying timings of the SCC candidates available for SCC change in CA for the UE are not identical with each other.

For example, in the case where the UE transmits an A1 MR including RSRP_2 for CC_3 upon detection of the RSRP of the CC_3 becoming equal to or greater than a threshold value after transmitting an A1 MR including RSRP_1 for CC_1, if RSRP_2 is meaningfully greater than RSRP_1 (e.g., RSRP_1>RSRP_2+alpha), it may be preferable to perform the UL CA SCC change to CC_3 in view of the throughput enhancement of the UE.

In order to solve the above problem, various disclosed embodiments may provide methods for a base station to configure an MR reception waiting timer for receiving an MR from the UE in the CA-based wireless communication system.

Figure 19:
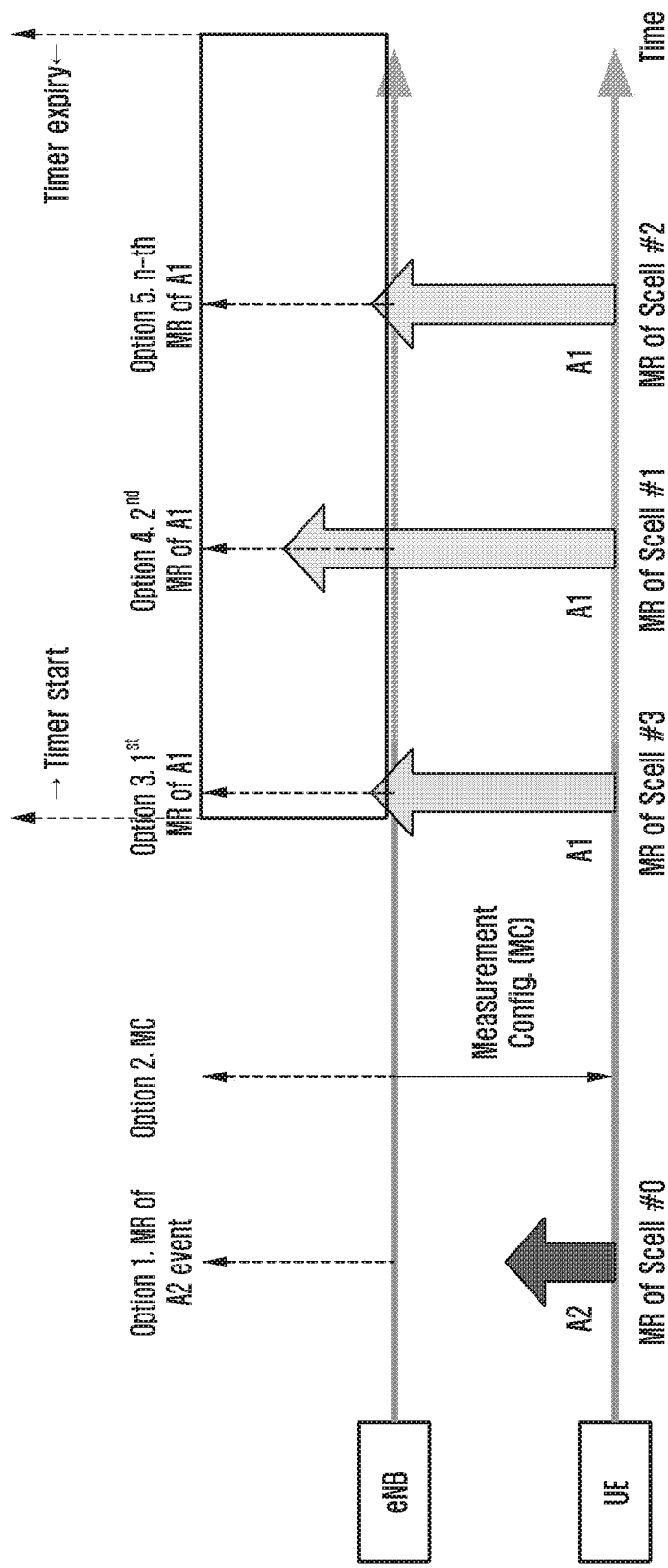
FIG. 19 is a diagram illustrating an operation for a base station to receive multiple A1 MRs from a UE based on an MR reception waiting timer operation in association with a UL CA SCC change operation according to an embodiment of the disclosure.

FIG. 19 is a diagram illustrating an operation for a base station to receive multiple A1 MRs from a UE based on an MR reception waiting timer operation in association with a UL CA SCC change operation according to an embodiment of the disclosure.

FIG. 19 is a conceptual diagram illustrating an operation for a base station to receive multiple MR messages associated with multiple SCells from a UE while a timer is running according to various disclosed embodiments.

Referring to FIG. 19, the base station may configure reception waiting timer operations for receiving multiple A1 MRs in association with the UL CA SCC change operation.

Referring to FIG. 19, when the A2 event occurs on a previously configured UL SCC, the UE may transmit an A2 MR to the base station.

The base station may perform A1 MC to the UE. Here, the base station may configure an A1 measurement event for one or more DL SCell carriers configured for CA in a CA UL SCell selection procedure.

Upon occurrence of the A1 event configured by the base station, the UE may transmit per-SCC candidate A1 MRs to the base station.

According to various disclosed embodiments, the base station may support an A1 MR reception timer, which may increase the A1 MR reception probability for multiple SCCs at the base station.

According to various disclosed embodiments, the base station may configure the MR reception waiting timer for receiving MRs from the UE based at least one of a timer start timing or a timer expiry timing.

For example, the timer start timing-based timer configuration method may include at least one of the following options.

Option 1) The timer starts at a serving UL SCell (A2 MR) reception time point.

Option 2) The timer starts at an MC configuration time point of the base station.

Option 3) The timer starts at a candidate UL SCell ($N^{th}$ arrived A1 MR) reception time point. Here, N may be provided as a base station configuration parameter.

The operation based on option 3) may include an operation of stopping the timer and selecting a UL SCC when the base station receive the first A1 MR. In the case where the timer starts according to option 3), the number of A1 MRs being received increases as the timer value increases, which increases UL SCC change procedure control delay.

The timer expiry timing-based timer configuration method may include at least one of the following options.

Option 4-1) The timer expires at a $K^{th}$ A1 MR reception time point of the base station. Here, K may be provided as a base station configuration parameter.

Option 4-2) The timer expires at a time point when the time period corresponding to the timer value elapses.

Option 4-3) The timer expires immediately at the $K^{th}$ A1 MR reception time point or at a time point when the time period corresponding to the timer value elapses even before receipt of the $K^{th}$ A1 MR.

Table 8 summarizes options of an MR reception waiting timer configuration of a base station and advantages and disadvantages of the options according to various disclosed embodiments.

For example, according to various disclosed embodiments, the base station may select, upon expiry of the timer, a UL SCC among candidate SCCs corresponding to the MRs including the highest RSRP level based on a metric configured by an operator such as frequency bandwidth.

For example, in the case where a weight is applied to a frequency bandwidth (BW) of a UL SCC, if BW_cell1 is 5 MHz and BW_cell2 is 10 MHz, the available UL BW of Cell2 is double the bandwidth of Cell2 even though the RSRP of Cell1 is higher than that of Cell2. In this case, it may be possible to use a method for selecting a UL SCC by applying a weighting factor reflecting BW to the RSRP value included in the received A1 MR as shown in the following equations.

$$\text{Utility\_Cell1} = \text{RSRP\_cell1} * \text{BW\_cell1} * \text{alpha}$$

$$\text{Utility\_cell2} = \text{RSRP\_cell2} * \text{BW\_cell2} * \text{alpha}$$

TABLE 8

A1/A2 event definition and summary of use cases (3GPP LTE RRC, TS 36.331)

| No. | Description | Pros | Cons | Characteristics |
|---|---|---|---|---|
| 1 | Start at serving UL SCell (A2 MR) reception time point | It is possible to perform UL SCell change as soon as possible after occurrence of A2 event | A1 MR reception probability decrease | When short timer value is set, it is probable to fail to receive A1 MR or select low quality CC |
| 2 | Start at MC configuration time point | | | |
| 3 | Start at candidate UL SCell (first arrived A1 MR) reception timing point | A1 MR reception probability increase (guarantee receipt of at least one A1 MR) | SCell change delay increases after receipt of occurrence of A2 event | Possible to guarantee receipt of number of A1 MRs (possible to change to best UL SCell) vs UL data rate reduction probability (service interruption) |
| 4 | Start at candidate UL SCell (second arrived A1 MR) reception time point | A1 MR reception probability increase (guarantee receipt of at least two A1 MRs) | | |
| 5 | Start at candidate UL SCell ($n^{th}$ arrived A1 MR) reception time point *n < number of DL CCs configurable for configured UL | A1 MR reception probability increase (guarantee receipt of at least n A1 MRs) | | |

According to various disclosed embodiments, the base station may reflect a weight factor to multiple SCells according to at least one of the following schemes in the Ul cell selection method.

1) To an MR equal to or greater than threshold_DL based on a DL received signal strength level 2) To an MR equal to or greater than threshold_UL based on a UL received signal strength level 3) To an MR equal to or greater than threshold_DL and equal to greater than threshold_UL based on DL and UL received signal strength levels According to various embodiments, the base station may apply the weight factor for selecting a UL SCell when multiple A1 MRs for a UL CA SCC change are received, after the MR reception waiting timer expires, using at least one of various methods as follows.

For example, when A1 MRs for Cell1 and Cell2 include corresponding RSRP values of RSRB_Cell1 and RSRP_Cell2 (RSRP_Cell1>RSRP_Cell2), it may be possible to select Cell1 having the best RSRP for selecting a UL SCC.

If Utility_Cell1<Utility_cell2, Cell2 to which the weighting factor reflecting the UL BW is applied may be selected as a target cell for the UL SCC change.

1) It may be possible to use a UL SCC change method for selecting an SCell corresponding to an MR carrying the greatest utility value among the MRs of candidate CA SCell carriers (based on DL received signal strength level for MRs of which the level is equal to or greater than the threshold_DL threshold, based on UL received signal strength level for MRs of which the level is equal to or greater than the threshold_UL, and based on UL and DL received signal strength levels for MRs of which the levels are equal to or greater than threshold_DL and threshold_UL, respectively), the utility value being resulted from one or a combination of RSRP, RSRQ, or SINR. It may also be possible to use a UL SCC change method for selecting a target cell having the highest utility value calculated in further consideration of a weighting factor reflecting another metric such as frequency bandwidth (BW) in addition to the DL received signal strength level such as RSRP/RSRQ.

2) It may be possible to use a UL SCC change method for selecting an SCell corresponding to an MR carrying the greatest utility value among the MRs of candidate UL CA SCell carriers (for MRs of a value obtained from at least one or a combination of RSRP, RSRQ, or SINR that is greater than a threshold value), e.g., by comparing utility values calculated by reflecting an additional metric in the case where a DL received signal strength level such as RSRP/RSRQ is equal to or greater than a threshold value as a determination operation among the candidate target cells of which the electric field is stronger than a weak electric field level rather than equally globally comparing the DL received signal strength levels such as RSRP/RSRQ or SINRs.

As described above, the reason for a comparison among the candidate target cells of which electric fields are stronger than a weak electric field level is that the UL transit power of the UE is limited and so should not to be increased in a weak electric field situation, even though the available BW is broadened.

2-1) It may be possible to select a UL SCell carrier based on at least one of bandwidths of candidate CCs or a number of UEs.

In the method of 2-1), the number of UEs may be determined based on at least one of a number of UEs added per CA'ed cell (based on DL, UL, or both DL and UL) or a number of activated UEs. For example, the number of UEs may include at least one of a number of additionally configured DL CC UEs, a number of additionally configured UL CC UEs, a number of Activated DL CC UEs, or a number of activated UL CC UEs.

According to various embodiments, the number of UEs may include a number of UEs configured with at least one of a PCell or an SCell. For example, the number of UEs may be one or a combination of a number of UEs configured with a PCell, a number of UEs configured with an SCell, and a number of UEs configured with a PCell and an SCell; and an SCell is selected among the cells weighted with the number of UEs.

2-2) It may be possible to select a UL SCell carrier based on at least one of operator-specific priority configuration or frequency band-specific priority configuration.

2-3) It may be possible to select a UL SCell carrier based on at least one of TBS, UL SINR, PRB usage, or number of active UEs.

Figure 20:
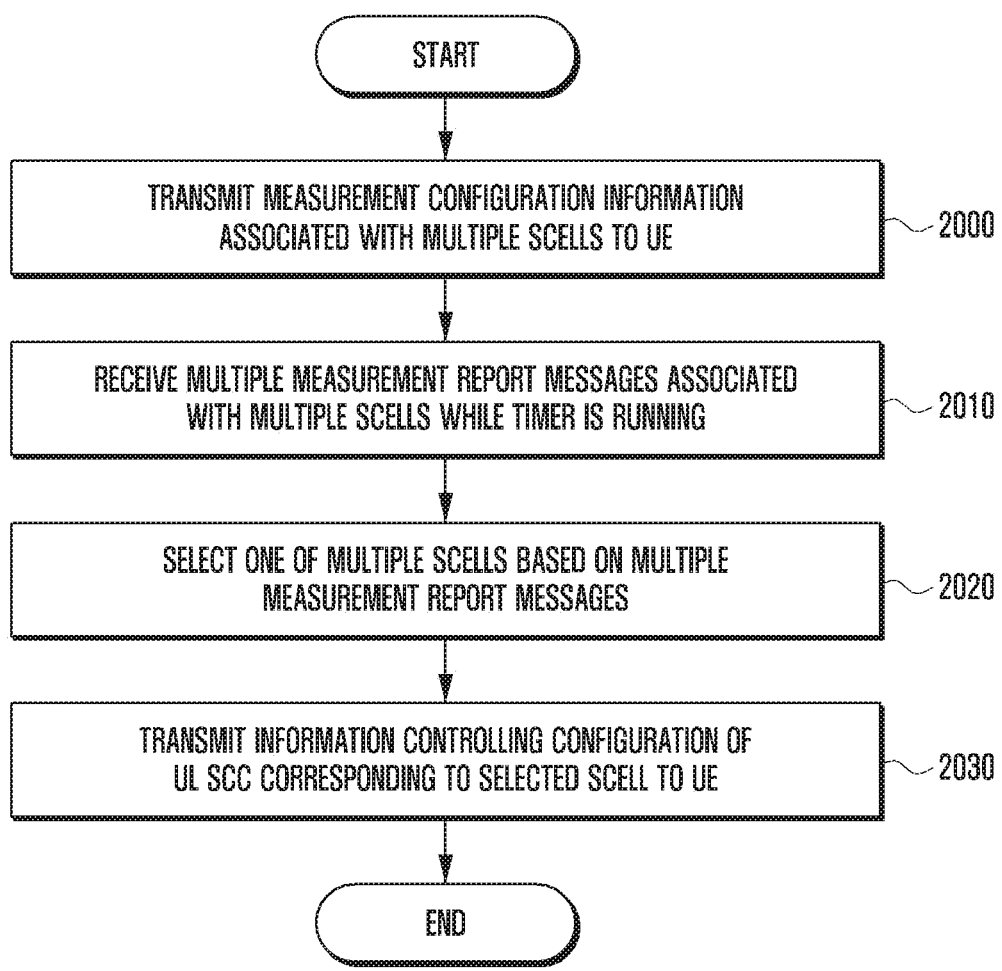
FIG. 20 is a flowchart illustrating a procedure for a base station to transmit information controlling configuration of a UL SCC corresponding to an SCell selected among multiple SCells according to an embodiment of the disclosure.

FIG. 20 is a flowchart illustrating a procedure for a base station to transmit information controlling configuration of a UL SCC corresponding to an SCell selected among multiple SCells according to an embodiment of the disclosure.

Referring to FIG. 20, at operation 2000, the base station may transmit measurement configuration information associated with multiple SCells to a UE.

At operation 2010, the base station may receive multiple MR messages associated with the multiple SCells while a timer is running.

At operation 2020, the base station may select one of the SCells based on the multiple MR messages received at operation 2010.

For example, the operation of receiving the multiple MR messages while the timer is running and the operation of selecting the SCell may be performed according to the method described with reference to FIG. 19.

At operation 2030, the base station may transmit information for controlling configuration of a UL SCC corresponding to the SCell selected at operation 2020.

For example, the information controlling configuration of the UL SCC corresponding to the selected SCell may include at least one of information configuring a UL SCC or information preventing configuration of a UL SCC.

According to various disclosed embodiments, a base station may identify second information for an SCell DL electric field of the selected SCell and transmit information controlling configuration of the UL SCC corresponding to the selected SCell based on at least one of first information or the second information.

For example, if at least one of the first information or the second information is indicative of a weak electric field, the information controlling configuration of the UL SCC may include information preventing configuration of the SCell.

For example, if neither the first information nor the second information is indicative of the weak electric field, the information controlling configuration of the UL SCC may include information configuring the UL SCC of the SCell.

Figure 21:
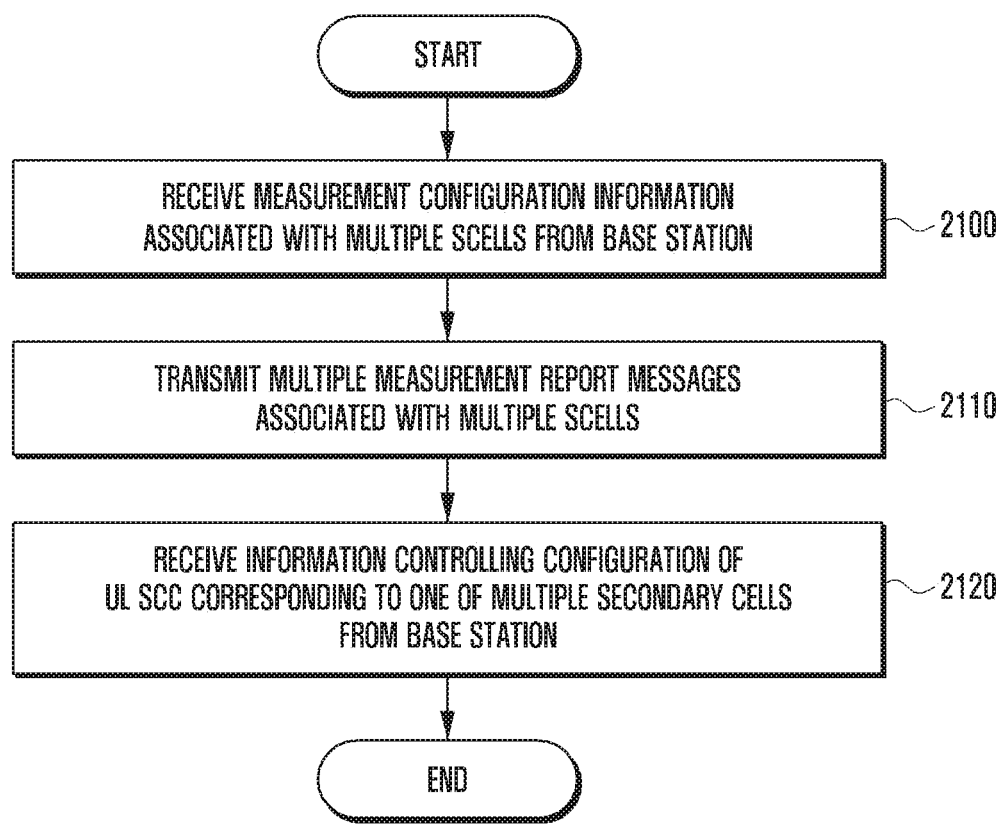
FIG. 21 is a flowchart illustrating a procedure for a UE to receive information controlling configuration of a UL SCC corresponding to an SCell selected among multiple SCells according to an embodiment of the disclosure.

FIG. 21 is a flowchart illustrating a procedure for a UE to receive information controlling configuration of a UL SCC corresponding to an SCell selected among multiple SCells according to an embodiment of the disclosure.

Referring to FIG. 21, at operation 2100, the UE may receive measurement configuration information associated with the multiple SCells from a base station.

At operation 2110, the UE may transmit multiple MR messages associated with the multiple SCells to the base station.

At operation 2120, the UE may receive information controlling configuration of a UL SCC corresponding to one of the multiple SCells from the base station.

For example, the base station may select one of the multiple SCells based on at least one of the multiple MR messages received while a timer is running.

For example, the information controlling configuration of the UL SCC corresponding to the selected SCell may include at least one of information configuring the UL SCC or information preventing configuration of the UL SCC.

For example, the information controlling configuration of the UL SCC corresponding to the selected SCell is obtained based on at least one of first information or second information.

For example, the first information may be associated with a UL electric field of a PCell, the second information may be associated with a DL electric field of the selected SCell, the first information and the second information being identified at the base station.

For example, if at least one of the first information or the second information is indicative of the weak electric field, the information controlling configuration of the UL SCC may include information preventing configuration of the UL SCC.

For example, if neither the first information nor the second information is indicative of the electric field, the information controlling configuration of the UL SCC may include information configuring the UL SCC of the SCell.

Figure 22:
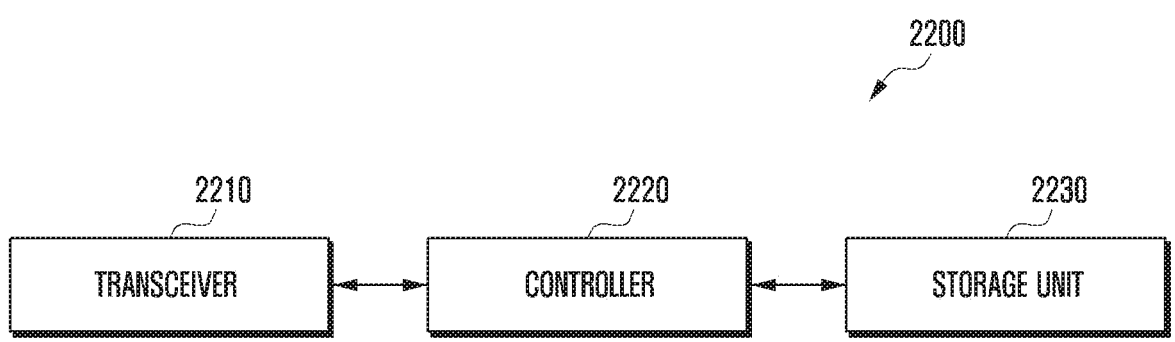
FIG. 22 is a block diagram illustrating a configuration of a base station 2200 according to various an embodiment of the disclosure.

FIG. 22 is a block diagram illustrating a configuration of a base station 2200 according to an embodiment of the disclosure.

Referring to FIG. 22, the base station 2200 may include a transceiver 2210, a controller 2220, and a storage unit 2230. In the disclosure, the controller 2220 may be defined as a circuit, an application-specific integrated circuit, or at least one processor.

The transceiver 2210 may communicate signals with a UE. The signals may include control information and data, and the transceiver may include a radio frequency (RF) transmitter for performing frequency up-conversion and amplification on transmit signals and an RF receiver for performing low-noise amplification and frequency down-conversion on receive signals. The transceiver 2210 may receive a signal over a radio channel and proceed to send the signal to the controller 2220 and transmit a signal output from the controller 2220 over the radio channel.

For example, the transceiver 2210 may transmit system information and synchronization and reference signals to UEs.

The controller 2220 may control overall operations of the base station as proposed in various disclosed embodiments.

For example, the controller 2220 may identify first information for PCell UL electric field strength in a CA-based wireless communication system.

For example, the first information may be indicative of a PCell UL electric field strength that is strong, moderate, or weak.

According to various disclosed embodiments, the first information associated with the PCell UL electric field may be identified based on at least one of SINR information, PHR information, or TBS information.

The controller 2220 may also control the transceiver 2210 to transmit measurement configuration information associated with an SCell to a UE and receive an MR message associated with the SCell from the UE.

The controller 2220 may also identify second information for an SCell DL electric field based on the MR message.

For example, the second information may be indicative of an SCell DL electric field strength that is strong, moderate, or weak.

The controller 2220 may also control the transceiver 2210 to transmit information controlling configuration of a UL SCC of the SCell based on at least one of the first information or the second information.

For example, the information controlling configuration of the UL SCC may include at least one of information configuring a UL SCC, information preventing configuration of a UL SCC, or information deconfiguring a configured UL SCC.

For example, if at least one of the first information and the second information is indicative of the weak electric field, the information controlling configuration of the UL SCC may include information preventing UL SCC configuration.

For example, if neither the first information nor the second information is indicative of the weak electric field, the information controlling configuration of the UL SCC may include information configuring the UL SCC of the SCell.

According to various disclosed embodiments, if the UL SCC corresponding to the SCell is configured to the UE, the controller 2220 may control the transceiver 2210 to receive third information associated with an SCell UL electric field.

For example, the third information may be indicative of an SCell UL electric field strength that is strong, moderate, or weak.

According to various disclosed embodiments, the third information associated with the SCell UL electric field may be identified based on at least one of SINR information, PHR information, or TBS information.

According to various disclosed embodiments, if the UL SCC corresponding to the SCell is configured to the UE, the controller 2220 may control the transceiver 2210 to transmit information controlling configuration of the UL SCC corresponding to the SCell based on at least one of the first information, second information, or third information.

For example, the information controlling configuration of the UL SCC may include at least one of information configuring a UL SCC, information preventing UL SCC configuration, or information deconfiguring a configured UL SCC.

For example, if at least one of the first information, second information, or third information is indicative of the weak electric field, the information controlling configuration of a UL SCC may include information deconfiguring the UL SCC of the SCell.

According to various disclosed embodiments, if the measurement configuration information is associated with a least one SCell, the controller 2220 may control the transceiver 2210 to receive at least one MR message associated with the at least one SCell from the UE while a timer is running.

In this case, the controller 2220 may select one of at least one SCell based on the at least one received MR message.

According to various disclosed embodiments, the controller 2220 may identify the second information of the DL electric field of the selected SCell and control the transceiver 2210 to transmit information controlling configuration of the UL SCC of the selected SCell based on at least one of the first information or the second information.

For example, the information controlling configuration of the UL SCC may include at least one of information configuring the UL SCC or information preventing UL SCC configuration.

For example, if at least one of the first information or the second information is indicative of the weak electric field, the information controlling configuration of the UL SCC may include information preventing configuration of the UL SCC of the SCell.

For example, if neither the first information nor the second information is indicative of the weak electric field, the information controlling configuration of the UL SCC may including information configuring the UL SCC of the SCell.

Figure 23:
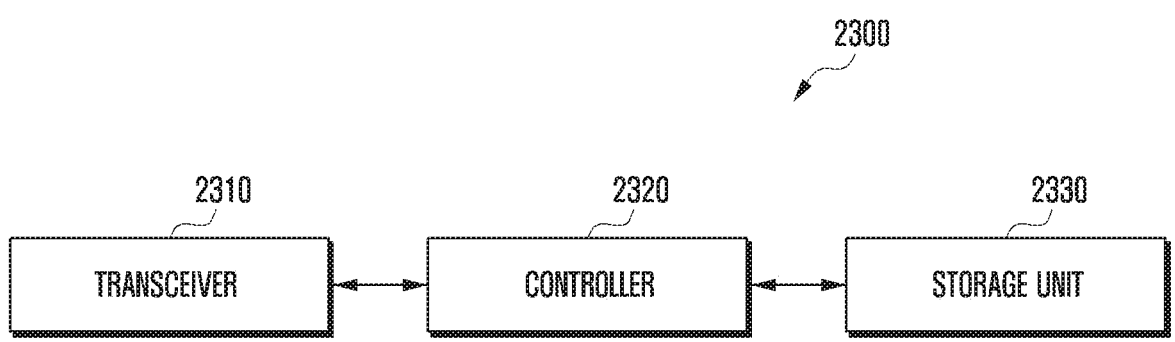
FIG. 23 is a block diagram illustrating a configuration of a UE according to an embodiment of the disclosure.

FIG. 23 is a block diagram illustrating a configuration of a UE according to embodiment of the disclosure.

Referring to FIG. 23, the UE 2300 may include a transceiver 2310, a controller 2320, and a storage unit 2330. In the disclosure, the controller 2320 may be defined as a circuit, an application-specific integrated circuit, or at least one processor.

The transceiver 2310 may communicate signals with a base station. The signals may include control information and data, and the transceiver may include an RF transmitter performing frequency up-conversion and amplification on transmit signals and an RF receiver for performing low noise amplification and frequency down-conversion on receive signals. The transceiver 2310 may receive a signal over a radio channel and proceed to send the signal to the controller 2320 and transmit a signal output from the controller 2320 over the radio channel.

For example, the transceiver 2310 may receive system information and synchronization and reference signals from the base station.

According to various disclosed embodiments, the controller 2320 may control overall operations of the base station as proposed in various disclosed embodiments.

According to various disclosed embodiments, the controller 2320 may control the transceiver 2310 to transmit information associated with a PCell UL electric field to the base station.

For example, the information associated with the PCell UL electric field is used by the base station to acquire first information indicative of the PCell UL electric field.

For example, the information associated with the PCell UL electric field may include at least one of SINR information, PHR information, or TBS information.

For example, the first information may be indicative of a PCell UL electric field strength that is strong, moderate, or weak.

That is, the base station may acquire the first information based on the information associated with the PCell UL electric field that is received from the UE.

According to various disclosed embodiments, the controller 2320 may control the transceiver 2310 to receive measurement configuration information associated with a SCell from the base station, transmit an MR message associated with the SCell based on the measurement configuration information, and receive information controlling configuration of a UL SCC corresponding to the SCell from the base station.

For example, the information controlling configuration of a UL SCC may include information configuring a UL SCC, information preventing UL SCC configuration, and information deconfiguring a configured UL SCC.

For example, the information controlling configuration of a UL SCC is generated based on first information associated with a PCell UL electric field and second information associated with an SCell DL electric field.

In this case, the base station acquires the second information based on the MR message transmitted by the UE.

For example, the second information may be indicative of an SCell DL electric field strength that is strong, moderate, or weak.

For example, if at least one of the first information or the second information is indicative of weak electric field, the information controlling configuration of the UL SCC may include information preventing configuration of the UL SCC of the cell.

For example, if neither the first information nor the second information is indicative of weak electric field, the information controlling configuration of the UL SCC may include information configuring the UL SCC of the SCell.

According to various disclosed embodiments, if the UL SCC corresponding to the SCell is configured, the controller 2320 may control the transceiver 2310 to transmit information associated with the SCell UL electric field to the UE.

For example, the information associated with the SCell UL electric field may be used by the base station to acquire third information associated with the SCell UL electric field.

For example, the information associated with the PCell UL electric field may include at least one of SINR information, PHR information, or TBS information.

For example, the third information may be indicative of an SCell UL electric field strength that is strong, moderate, or weak.

That is, the base station acquires the third information based on the information associated with the SCell UL electric field that is received from the UE.

According to various disclosed embodiments, if the UL SCC corresponding to the SCell is configured to the UE 2300, the controller 2320 may control the transceiver 2310 to receive information controlling configuration of the UL SCC corresponding to the SCell based on at least one of the first information, the second information, or the third information from the base station.

For example, the information controlling configuration of the UL SCC may include at least one of information configuring the UL SCC, information preventing configuration of the UL SCC, or information deconfiguring the configured UL SCC.

For example, if at least one of the first information, the second information, or the third information is indicative of weak electric field, the information controlling configuration of the UL SCC may include information deconfiguring the UL SCC of the SCell.

According to various disclosed embodiments, if the measurement configuration information received from the base station is associated with at least one SCell, the controller 2320 may control the transceiver 2310 to transmit at least one MR message associated with at least one SCell while a timer is running and receive information configuring the UL SCC corresponding to one of multiple SCells from the base station.

For example, the at least one SCell may include a cell that the base station selects based on the at least one MR message received from the UE while the timer is running at the base station.

According to various disclosed embodiments, the controller 2320 may control the transceiver 2310 to receive information controlling configuration of the UL SCC corresponding to the selected SCell from the base station.

For example, the information controlling configuration of the UL SCC corresponding to the selected SCell may include at least one of information configuring the UL SCC or preventing configuration of the UL SCC.

In this case, the information controlling configuration of the UL SCC corresponding to the selected SCell is identified based on at least one of the first information or the second information.

For example, the first information is associated with the UL electric field of the PCell and the second information is associated with the DL electric field of the SCell, both the first information and the second information being acquired by the base station.

For example, if the at least one of the first information and the second information is indicative of a weak electric field, the information controlling configuration of the UL SCC may include information preventing UL SCC configuration.

For example, if neither the first information nor the second information is indicative of a weak electric field, the information controlling configuration of the UL SCC may include information configuring the UL SCC of the SCell.

As described above, the methods for transmitting and receiving information controlling configuration of a UL SCC corresponding to a secondary cell in a CA-based wireless communication system according to various disclosed embodiments are advantageous in terms of selecting a best UL SCC, while minimizing a latency occurring in association with a UL SCC configuration, deconfiguration, maintenance, or change, in consideration of at least one of downlink (DL) and UL electric field environments.

The methods for transmitting and receiving information controlling configuration of a UL SCC corresponding to a secondary cell in a CA-based wireless communication system according to various disclosed embodiments are also advantageous in terms of protecting against uplink throughput degradation (e.g., increase of RRC Connection Reestablishment, increase of outage, and frequent occurrence of radio link failure (RLF)) caused by dividing UL power of a UE for a primary cell (PCell) and a secondary cell (SCell) in such a way of preventing configuration of a UL SCC in a weak DL or UL electric field environment.

The methods for transmitting and receiving information controlling configuration of a UL SCC corresponding to a secondary cell in a CA-based wireless communication system according to various disclosed embodiments are also advantageous in terms of increasing a probability of receiving multiple measurement reports (MRs) before expiry of a reception waiting timer configured for a base station to receive the MRs transmitted by a UE while the timer is running, the MR being used as a basis for selecting a UL SCC in a UL SCC change operation, and increasing a degree of freedom of selecting a UL SCC by configuring SCC bandwidth-based weight factors.

The methods for transmitting and receiving information controlling configuration of a UL SCC corresponding to a secondary cell in a CA-based wireless communication system according to various disclosed embodiments are also advantageous in terms of improving a UL peak throughput or average throughput of a UE by enabling a base station to select the best Ul SCC.

In the disclosed embodiments, the components are described in singular or plural forms depending on the embodiment. However, the singular and plural forms are selected appropriately for the proposed situation just for explanatory convenience without any intention of limiting the disclosure thereto; thus, the singular form includes the plural form as well, unless the context clearly indicates otherwise.

Although the description has been made with reference to particular embodiments, the disclosure can be implemented with various modifications without departing from the scope of the disclosure. Thus, the disclosure is not limited to the particular embodiments disclosed and will include the following claims and their equivalents.

Various disclosed embodiments and terms used herein are not intended to limit the disclosure, but rather they are to help understand the disclosure, and it should be understood that the embodiments include all changes, equivalents, and/or substitutes within the spirit and scope of the disclosure. The same reference numbers are used throughout the drawings to refer to the same or like parts. As used herein, the singular forms "a", "an" and "the" are intended to include the plural forms as well, unless the context clearly indicates otherwise. In various disclosed embodiments, expressions such as "A or B", "at least one of A and/or B", "A, B, or C", or "at least one of A, B, and/or C" may include all possible combinations of the enumerated items. In the various disclosed embodiments, terms such as "$1^{st}$", "$2^{nd}$", "first", "second," etc. are used to modify corresponding components and distinguish among different components without restricting the order and/or importance thereof. When it is mentioned that a (first) component is "(functionally or communicatively) connected" to or "accessed" by another (second) component, it may be understood that the component is directly connected to or accessed by the other component or that still another (third) component is interposed between the two components.

In the disclosed embodiments, the term "module" means, but is not limited to, a unit of one of software, hardware, and firmware or any combination thereof; the term "module" may be used interchangeably with the terms "unit," "logic," "logical block," "component," or "circuit." The term "module" may denote a smallest unit of component or a part thereof. For example, a module may be configured in the form of an Application-Specific Integrated Circuit (ASIC) chip.

The various disclosed embodiments may be implemented in the form of a software program (e.g., program) including instructions stored in a machine-readable (e.g., computer-readable) storage medium (e.g., internal memory and external memory). The machine may be a device which is capable of calling out and executing an instruction from the storage medium to perform an operation, examples of the machine may include the secondary base station or UE disclosed in the various embodiments. If the instruction is executed by a processor (e.g., controller 2220 in FIG. 22 or controller 2320 in FIG. 23), the processor may execute a corresponding function autonomously or control other components to execute the corresponding function. The instruction may include a code generated or executed by a compiler or an interpreter.

The machine-readable storage medium may be a non-transitory storage medium. As used herein, the expression "non-transitory" is used to intend that the storage medium includes no signal and is tangible regardless of whether data are stored in the storage medium semi-persistently or temporarily.

A method according to any of various disclosed embodiments may be provided in the form of a computer program product. The computer program product may be traded between a seller and a buyer. The computer program product may be distributed on a machine-readable storage medium (e.g., compact disc read only memory (CD-ROM)) or through an application store (e.g., Playstore™). In the case of on-line distribution, at least part of the computer program product may be temporarily stored or instantly generated in a storage medium such as a memory of a manufacturer's server, an application store sever, or a relay server.

The components (e.g., module and program) according to various disclosed embodiments may include at least one of the aforementioned components with omission of some components or addition of other components. Alternatively or additionally, the components (e.g., module and program) may be selectively combined into an entity to perform the functions of the components equally as before the combination or in similar manners. The operations of the modules, programming modules, or other components according to various disclosed embodiments may be executed in series, in parallel, recursively, or heuristically; also, some operations may be executed in different order, omitted, or extended with other operations.

What is claimed is:

1. A method performed by a base station in a wireless communication system, the method comprising:
receiving, from a terminal, information on a power headroom report (PHR);
identifying, by the base station, a transport block size (TBS) available for a primary cell based on the PHR;
identifying, by the base station, first information associated with an uplink (UL) electric field of the primary cell based on the TBS available for the primary cell; and
transmitting, to the terminal, information for controlling configuration of a UL secondary component carrier (SCC) of a secondary cell based on the first information.

2. The method of claim 1, further comprising:
transmitting, to the terminal, measurement configuration information associated with the secondary cell;
receiving, from the terminal, a measurement report message associated with the secondary cell; and
identifying second information associated with a downlink electric field of the secondary cell based on the measurement report message,
wherein the information for controlling configuration of the UL SCC is generated based on the first information and the second information.

3. The method of claim 1, wherein the information for controlling configuration of the UL SCC includes information for preventing configuration of the UL SCC of the secondary cell.

4. The method of claim 1, wherein the information for controlling configuration of the UL SCC includes information for deconfiguring the UL SCC of the secondary cell.

5. The method of claim 1, further comprising:
identifying a number of allocable resource blocks (RBs) and a modulation and coding scheme (MCS) based on the PHR,
wherein the TBS available for the primary cell is calculated based on the number of RBs and the MCS.

6. A method performed by a terminal in a wireless communication system, the method comprising:
transmitting, to a base station, information on a power headroom report (PHR); and
receiving, from the base station, information for controlling configuration of an uplink (UL) secondary component carrier (SCC) of a secondary cell,
wherein the information on the PHR is used by the base station to identify a transport block size (TBS) available for a primary cell, and
wherein the information for controlling configuration of the UL SCC is generated based on first information associated with a UL electric field of the primary cell, the first information being identified by the base station based on the TBS available for the primary cell.

7. The method of claim 6, further comprising
receiving, from the base station, measurement configuration information associated with the secondary cell; and
transmitting, to the base station, a measurement report message associated with the secondary cell based on the measurement configuration information,
wherein the information for controlling configuration of the UL SCC is generated based on the first information and second information associated with a downlink electric field of the secondary cell, the second information being identified based on the measurement report message.

8. The method of claim 6, wherein the information for controlling configuration of the UL SCC includes information for preventing configuration of the UL SCC of the secondary cell.

9. The method of claim 6, wherein the information for controlling configuration of the UL SCC includes information for deconfiguring the UL SCC of the secondary cell.

10. The method of claim 6, wherein the information on the PHR is used to identify a number of allocable resource blocks (RBs) and a modulation and coding scheme (MCS), and
wherein the TBS available for the primary cell is calculated based on the number of RBs and the MCS.

11. A base station in a wireless communication system, the base station comprising:
a transceiver; and
at least one processor configured to:
receive, from a terminal via the transceiver, information on a power headroom report (PHR),
identify a transport block size (TBS) available for a primary cell based on the PHR,
identify first information associated with an uplink (UL) electric field of the primary cell based on the TBS available for the primary cell, and
transmit, to the terminal via the transceiver, information for controlling configuration of a UL secondary component carrier (SCC) of a secondary cell based on the first information.

12. The base station of claim 11,
wherein the at least one processor is further configured to:
transmit, to the terminal via the transceiver, measurement configuration information associated with the secondary cell,
receive, from the terminal via the transceiver, a measurement report message associated with the secondary cell, and
identify second information associated with a downlink electric field of the secondary cell based on the measurement report message, and
wherein the information for controlling configuration of the UL SCC is generated based on the first information and the second information.

13. The base station of claim 11, wherein the information for controlling configuration of the UL SCC includes information for preventing configuration of the UL SCC of the secondary cell.

14. The base station of claim 11,
wherein the information controlling configuration of the UL SCC includes information for deconfiguring the UL SCC of the secondary cell.

15. The base station of claim 11,
wherein the at least one processor is further configured to identify a number of allocable resource blocks (RBs) and a modulation and coding scheme (MCS) based on the PHR, and
wherein the TBS available for the primary cell is calculated based on the number of RBs and the MCS.

16. A terminal in a wireless communication system, the terminal comprising:
a transceiver; and
at least one processor configured to:
transmit, to a base station via the transceiver, information on a power headroom report (PHR); and
receive, from the base station, information for controlling configuration of an uplink (UL) secondary component carrier (SCC) of a secondary cell,
wherein the information on the PHR is used by the base station to identify a transport block size (TBS) available for a primary cell, and
wherein the information for controlling configuration of the UL SCC is generated based on first information associated with a UL electric field of the primary cell, the first information being identified by the base station based on the TBS available for the primary cell.

17. The terminal of claim 16,
wherein the at least one processor is further configured to:
receive, from the base station via the transceiver, measurement configuration information associated with the secondary cell, and
transmit, to the base station via the transceiver, a measurement report message associated with the secondary cell based on the measurement configuration information, and
wherein the information for controlling configuration of the UL SCC is generated based on the first information and second information associated with a downlink electric field of the secondary cell, the second information being identified based on the measurement report message.

18. The terminal of claim 16, wherein the information for controlling configuration of the UL SCC includes information for preventing configuration of the UL SCC of the secondary cell.

19. The terminal of claim 16, wherein the information for controlling configuration of the UL SCC includes information for deconfiguring the UL SCC of the secondary cell.

20. The terminal of claim 16,
wherein the information on the PHR is used to identify a number of allocable resource blocks (RBs) and a modulation and coding scheme (MCS), and
wherein the TBS available for the primary cell is calculated based on the number of RBs and the MCS.

* * * * *